(12) United States Patent
Larochelle et al.

(10) Patent No.: US 7,251,396 B2
(45) Date of Patent: Jul. 31, 2007

(54) DEVICE FOR TAILORING THE CHROMATIC DISPERSION OF A LIGHT SIGNAL

(75) Inventors: Sophie Larochelle, Cap-Rouge (CA); Serge Doucet, Quebec (CA)

(73) Assignee: Universite Laval, Quebec (CA)

( * ) Notice: Subject to any disclaimer, the term of this patent is extended or adjusted under 35 U.S.C. 154(b) by 74 days.

(21) Appl. No.: 11/147,023

(22) Filed: Jun. 6, 2005

(65) Prior Publication Data

US 2006/0182392 A1 Aug. 17, 2006

Related U.S. Application Data

(60) Provisional application No. 60/653,111, filed on Feb. 16, 2005.

(51) Int. Cl.
*G02B 6/34* (2006.01)
(52) U.S. Cl. .................. 385/37; 398/87; 398/149
(58) Field of Classification Search .......... 398/81, 398/87, 147, 149, 159; 385/24, 31, 37
See application file for complete search history.

(56) References Cited

U.S. PATENT DOCUMENTS

| 5,671,307 A | 9/1997 | Lauzon et al. ............... 385/37 |
| 5,694,501 A | 12/1997 | Alavie et al. ............... 385/37 |
| 5,982,791 A * | 11/1999 | Sorin et al. ............... 372/25 |
| 5,982,963 A * | 11/1999 | Feng et al. ............... 385/37 |
| 6,122,421 A | 9/2000 | Adams et al. ............... 385/37 |
| 6,356,684 B1 * | 3/2002 | Patterson et al. ............... 385/37 |
| 6,360,042 B1 | 3/2002 | Long ............... 385/37 |
| 6,363,187 B1 * | 3/2002 | Fells et al. ............... 385/37 |
| 6,879,755 B2 * | 4/2005 | Morin et al. ............... 385/37 |
| 7,062,123 B2 * | 6/2006 | DeBaun et al. ............... 385/27 |
| 2003/0210864 A1 | 11/2003 | Sugden et al. ............... 385/37 |

FOREIGN PATENT DOCUMENTS

| CA | 2 417 317 A1 | 7/2004 |
| CA | 2 441 916 A1 | 3/2005 |

OTHER PUBLICATIONS

Painchaud, Y., et al., "Superposition of chirped fibre Bragg grating for third-order dispersion compensation over 32 WDM channels", Electronics Letters, Nov. 21, 2002, vol. 38, No. 24, pp. 1572-1573.

(Continued)

*Primary Examiner*—Sung Pak
*Assistant Examiner*—Daniel Petkovsek
(74) *Attorney, Agent, or Firm*—Darby & Darby

(57) ABSTRACT

A device for tailoring the chromatic dispersion of a multi-channel light signal is proposed. The device includes at least two waveguides coupled in a cascade, each provided with a spatially distributed optical filter. The group delay response of the filters is designed so that the group delay of each channel of the light signal can be tuned independently of the others, and an appropriate tuning mechanism is provided for this purpose. The device may advantageously be used as a flexible dispersion compensator.

18 Claims, 21 Drawing Sheets

OTHER PUBLICATIONS

Li, Hongpu, et al., "Phased-Only Sampled Fiber Bragg Gratings for High-Channel-Count Chromatic Dispersion Compensation", Journal of Lightwave Technology, Sep. 2003, vol. 21, No. 9, pp. 2074-2083.

Doucet, S., et al., "High-finesse large band Fabry-Perot fibre filter with superimposed chirped Bragg gratings", Electronics Letters, Apr. 25, 2002, vol. 38, No. 9, pp. 402-403.

Shu, Xuewen, et al., "Tunable Dispersion Compensator Based on Distributed Gires-Tournois Etalons", IEEE Photonics Technology Letters, Aug. 2003, vol. 15, No. 8, pp. 1111-1113.

Moss, D. J., et al., "Tunable Dispersion and Disperson Slope Compensators for 10 Gb/s Using All-Pass Multicavity Etalons", IEEE Photonics Technology Letters, May 2003, vol. 15, No. 5, pp. 730-732.

Shu, Xuewen, et al., "Design and Realization of Dispersion Slope Compensators Using Distributed Giers-Toumois Etalons", IEEE Photonics Technology Letters, Apr. 2004, vol. 16, No. 4, pp. 1092-1094.

Shu, Xuewen, et al., "Tunable dispersion slope comensator using novel tailored Gires-Tournois etalons", in Optical Fiber Communication on CD-ROM (The Optical Society of America, Washington, DC, 2004), WK5.

Doucet, S., et al., "Tunable Dispersion and Dispersion Slope Compensator Using Novel Gires-Tournois Bragg Grating Coupled-Cavities", IEEE Photonics Technology Letters, Nov. 2004, vol. 16, No. 11, pp. 2529-2531.

Erdogan, Turan, "Fiber Grating Spectra", Journal of Lightwave Technology, Aug. 1997, vol. 15, No. 8, pp. 1277-1294.

* cited by examiner

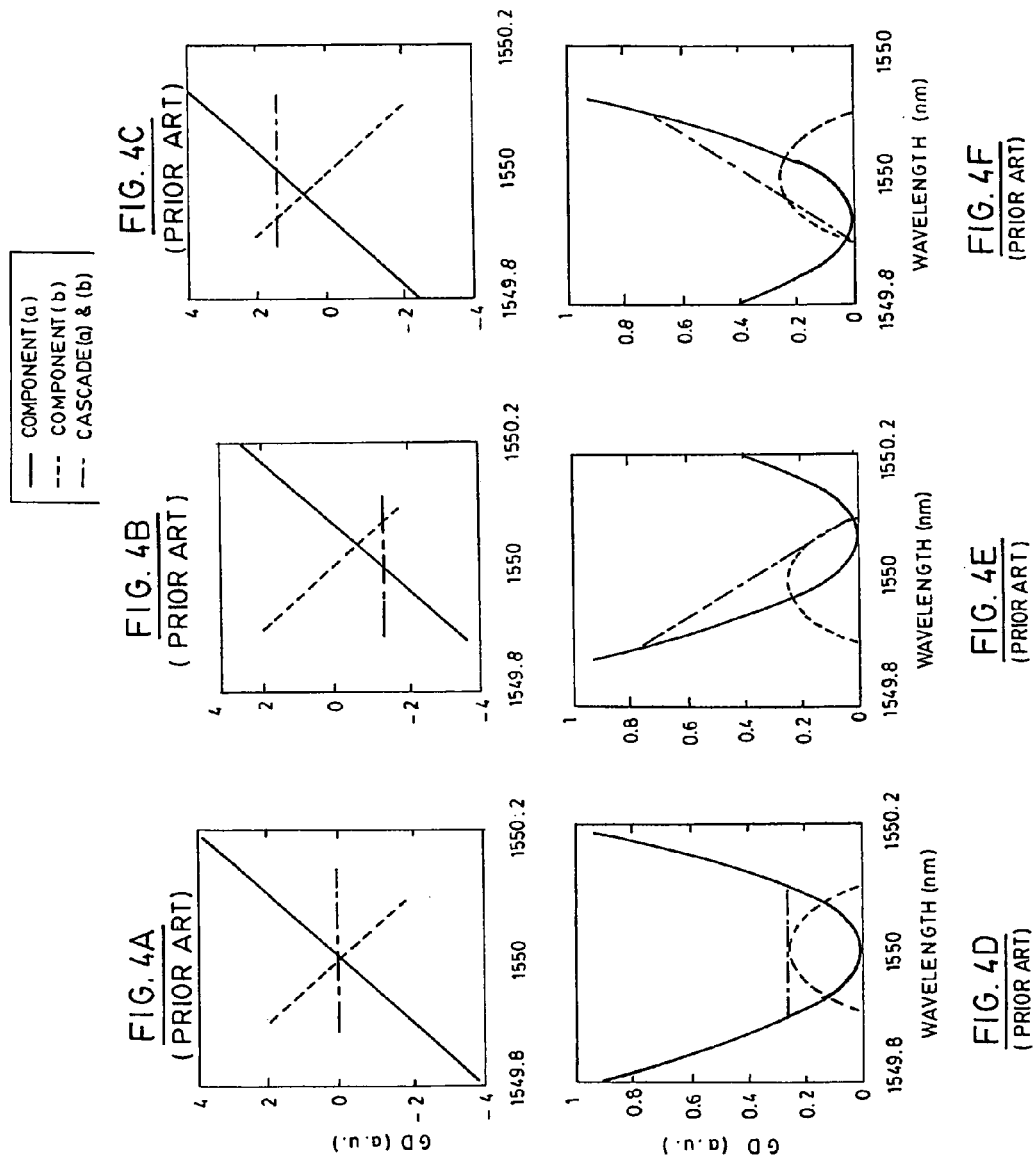

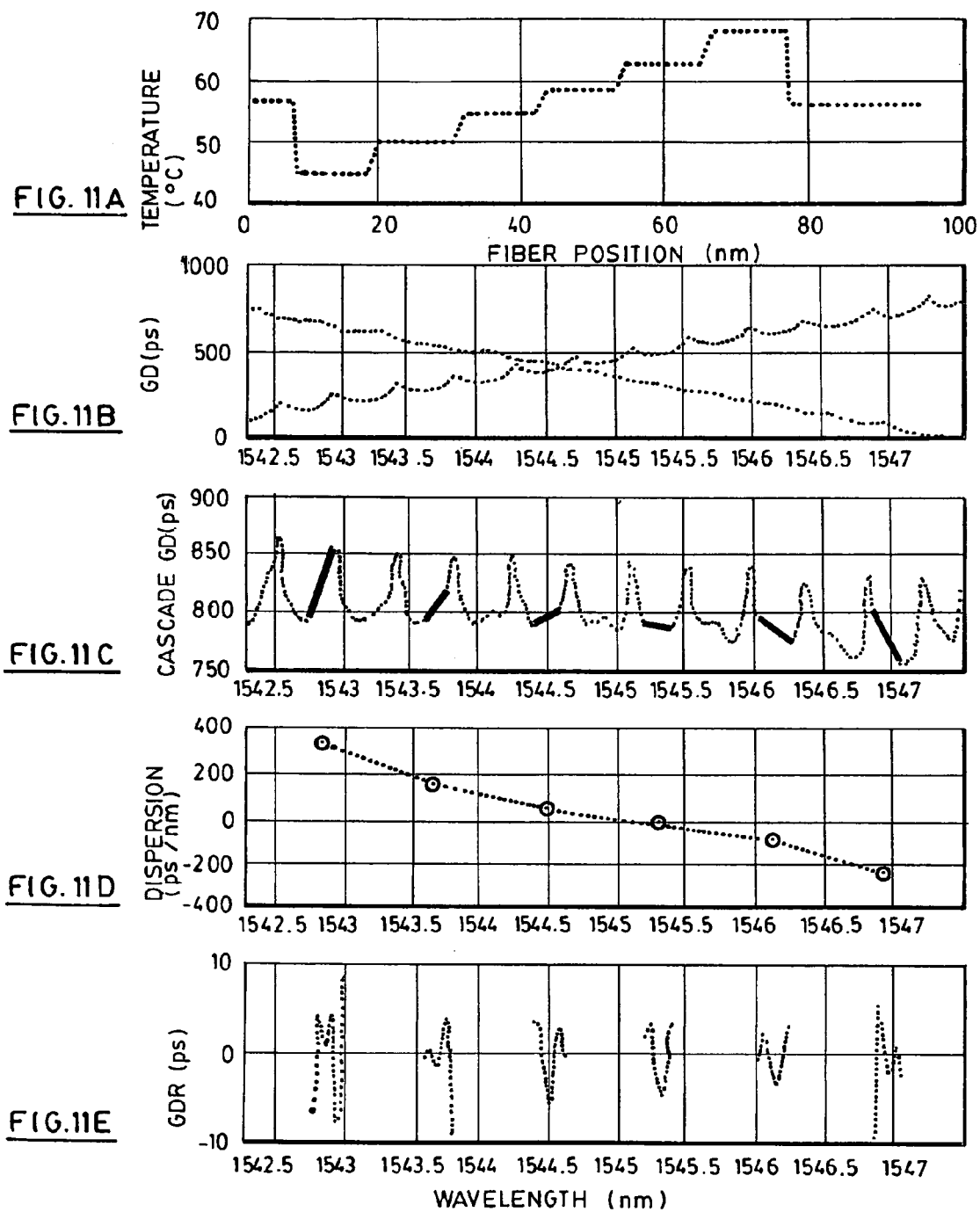

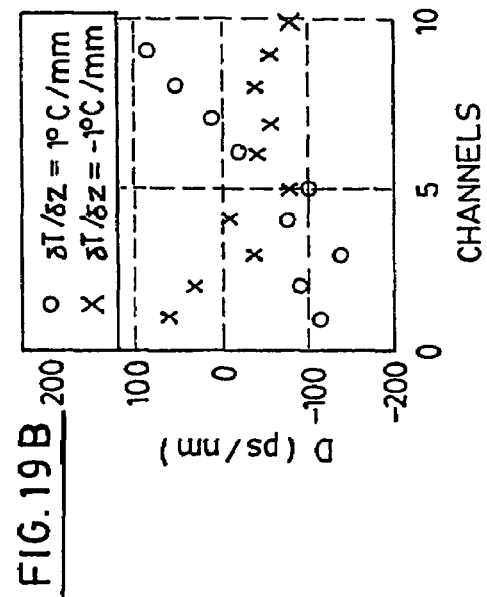
FIG. 19B
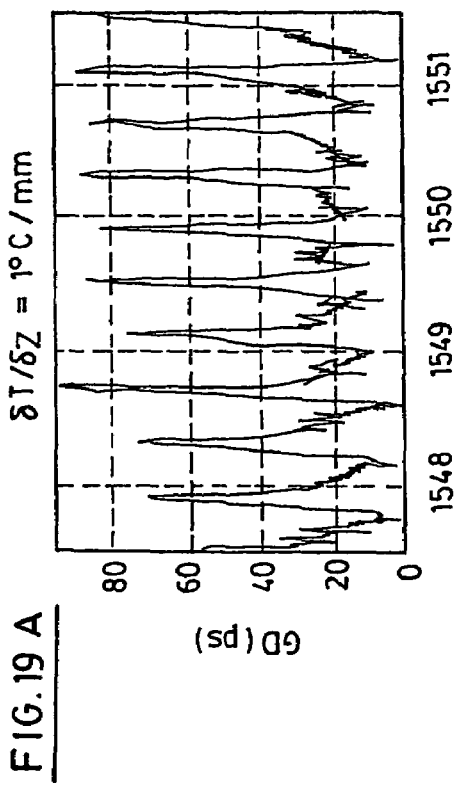
FIG. 19A
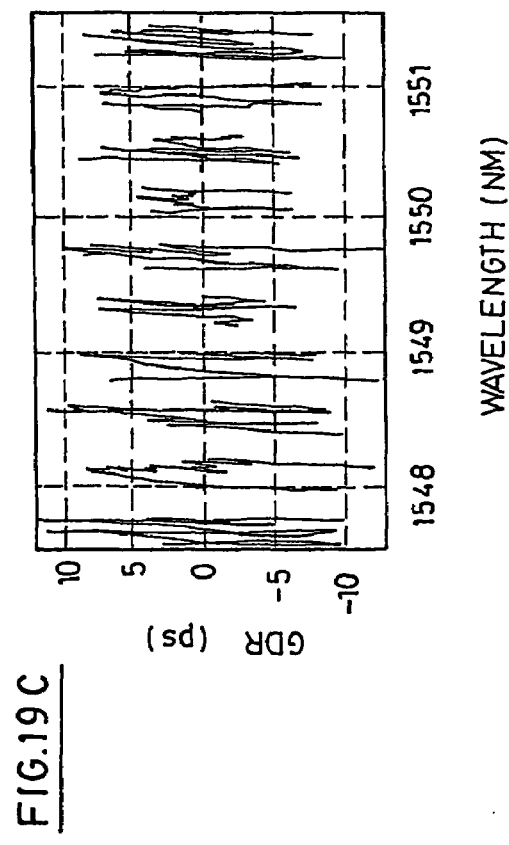
FIG. 19D
FIG. 19C

DEVICE FOR TAILORING THE CHROMATIC DISPERSION OF A LIGHT SIGNAL

FIELD OF THE INVENTION

The present invention relates to the field of optical components and more particularly concerns a flexible and tunable multi-channel device for independently assigning specific dispersion values to each optical channel of a light signal.

BACKGROUND OF THE INVENTION

When transmitting a modulated optical signal in an optical fiber link, the wavelength dependence of the effective index of the fiber fundamental mode induces differences in the propagation delays experienced by the various spectral components. For a narrowband signal at a given wavelength, the propagation delay is called group delay (GD) and is typically expressed in ps. The GD is calculated with equation (1) where $\lambda$ is the wavelength, $\phi$ is the optical phase and c is the speed of light.

$$GD = \frac{-\lambda^2}{2\pi c} \frac{d\phi(\lambda)}{d\lambda} \quad (1)$$

For example, the optical phase in (1) can be modified by an optical filter or by propagation through an optical fiber. The spectral variation of the GD is called chromatic dispersion (CD). The CD is the slope of the GD curve with respect to wavelength and is expressed in ps/nm.

In the presence of CD, an optical signal is distorted and inter-symbol interference can appear at the output of a long fiber link. This problem is usually addressed by the use of CD compensators which introduce a CD with an opposite value (negative vs positive) to that induced by a given optical fiber length. A standard G.652 optical fiber has a CD value around 17 ps/nm-km. Optical networks with Wavelength Division Multiplexing (WDM) transmit several optical channels spaced by 50 GHz, 100 GHz or 200 GHz over a predetermined optical band. For example, the C-band covers the wavelength range between 1530 nm and 1570 nm. One difficulty in CD compensation is that the CD is not constant between 1530 nm and 1570 nm and, furthermore, this variation depends on the fiber type. This wavelength dependence is called the CD slope (CDS) and is expressed in ps/nm². Wideband multi-wavelength CD compensators have to take this difference into account because CDS has a critical impact on the performance of high bit rate data link.

In optical networks, the CD can vary as a result of reconfigurations of the network or variations in the environment, for example temperature. Tunable CD compensators are therefore needed to dynamically adjust the CD compensation level over a given range. Furthermore, to have more adaptability, tunable CD compensators must be able to compensate the CDS. Desired properties of a tunable CD compensator therefore include flexibility on the setting of the mean CD value across the whole spectral band, called nominal value, and on the setting of the CDS. Ideally, tunable CD compensators should provide independent CD setting for each optical channel. This feature is particularly important when the channels present in the covered spectral band are propagated through different link lengths.

Fiber Bragg Grating Dispersion Compensator

Fiber Bragg gratings (FBGs) consists of a refractive index modulation along the fiber axis, denoted z. The resulting effective index modulation is expressed by (2).

$$n_{eff}(z) = n_{ave}(z) + \Delta n(z) \sin\left(\int_0^z \frac{2\pi}{\Lambda_G(z')} dz'\right) \quad (2)$$

Where $n_{eff}$ is the effective index of the optical fiber, $n_{ave}$ is the average effective index, $\Delta n$ is the effective index modulation and $\Lambda_G(z)$ is the local grating period. FBGs reflect the incoming light which has spectral components close to the Bragg wavelength ($\lambda_B$) expressed in (3).

$$\lambda_B(z) = 2 n_{ave} \Lambda_G(z) \quad (3)$$

Chirped FBGs (CFBGs) are FBGs in which $\Lambda_G$ varies along the fiber propagation axis. According to (3), the wavelength of the reflected signal, $\lambda_B$, will also vary along the optical fiber axis. This longitudinal $\lambda_B$ variation introduces a propagation delay between the different spectral components of an incoming signal. The delay is related to the position along the fiber axis at which the reflection is maximized for the respective wavelengths. A single channel CD compensator may thus be realized by using a small linear variation of $\Lambda_G(z)$ as is schematically represented in FIG. 1A (PRIOR ART). Longer wavelengths of the reflected spectral band ($\lambda_L$) are reflected into the first part of the CFBG, which have shorter propagation delay, while central wavelengths ($\lambda_C$) and shorter wavelengths ($\lambda_S$) are reflected afterwards. For a fixed reflection bandwidth, the CD value of a CFBG is related to its chirp. FIG. 1B (PRIOR ART) illustrates a single channel CD compensator with a higher CD, with smaller chirp, than (a) for the same reflection bandwidth.

Single channel tunable CD compensators can be obtained by inducing a longitudinal variation of $n_{eff}$ or $\Lambda_G$ which changes the reflection position of each wavelength along the CFBG. Different implementations of this technique are disclosed in U.S. Pat. No. 5,671,307 (Lauzon et al.) using a temperature gradient, in U.S. Pat. No. 5,964,501 (Alavie) and U.S. Pat. No. 6,360,042 (Long) with a strain gradient or with magnetostriction in U.S. Pat. No. 6,122,421 (Adams et al.).

Multi-wavelength FBG CD compensators can be obtained by superimposing many CFBGs with spectral responses centered at different wavelengths spaced by 50 GHz, 100 GHz or 200 GHz (Y. Painchaud, H. Chotard, A. Mailloux, Y. Vasseur, "*Superposition of chirped fibre Bragg grating for third-order dispersion compensation over 32 WDM channels*", Electronics Letters vol. 38, no. 24, pp. 1572-1573 (2002)), or by using FBGs sampled in amplitude and phase (H. Li, Y. Sheng, Y. Li, and J. E. Rothenberg, "*Phased-Only Sampled Fiber Bragg Gratings for High-Channel-Count Chromatic Dispersion Compensation*", J. Lightwave Technol vol. 21, pp. 2074-2083 September 2003). In these devices, compensation of CDS is possible with proper control of the FBG characteristics. This is schematically demonstrated in FIGS. 2A and 2B (PRIOR ART) where a three channel CD compensator is illustrated with a CD that has an inter channel variation to compensate the CDS of an optical fiber link. Similarly to single CFBG, CD tunability is achieved by applying a longitudinal perturbation along the FBG. However, these devices do not offer independence of the average CD setting of each channel and therefore do not provide CDS tunability. To overcome this limitation, the use of a cascade of two multi-wavelength CD compensators is disclosed in Canadian patent application no. 2,417,317 (Morin et al.).

CD Compensators with Distributed Resonant Cavities: Principle of Operation

Resonant Cavity Basis

Two parallel and highly reflective mirrors form a resonant optical cavity in which constructive interference occurs for specific cavity modes. The frequency spacing between each cavity mode is called the Free Spectral Range (FSR) and is obtained with (4), where c is speed of light in vacuum, d the distance between the mirrors and $n_g$ is the group index of the medium between the mirrors, $n_g = n_{eff} - \lambda(dn_{eff}/d\lambda)$.

$$FSR = \frac{c}{2n_g d} \quad (4)$$

The spectral position of each cavity mode is evaluated with (5), where $\lambda_m$, the $m^{th}$ cavity mode, is directly related to the average of the effective refractive index of the medium.

$$\lambda_m = \frac{2n_{ave} d}{m} \quad (5)$$

FBG-Based Resonant Cavities

Resonant cavities need at least two mirrors which are spatially separated. An all-fiber wideband resonant cavity can be formed by two CFBGs, with the same reflection band, that are partially superimposed with a small longitudinal shift (d) along the fiber axis. In S. Doucet, R. Slavik, Sophie LaRochelle. "*High-finesse large Band Fabry-Perot fibre filter with superimposed chirped Bragg Gratings*", Elec. Lett., Vol. 38, no 9, April 2002, pp. 160-160, a Fabry-Perot interferometer with two mirrors of similar reflectivity, was realized with superimposed CFBGs. Another type of interferometer is formed with one strong back mirror and other weaker mirror on the input side. This interferometer is an asymmetric Fabry-Perot, which is called a Gires-Tournois etalon (GTE). GTEs are used in reflection to modify the phase and to induce dispersion on an incident optical signal. Indeed, due to their strong back reflectors, GTEs are constant amplitude filters called all-pass filters. However, at the wavelengths corresponding to the cavity modes, the filter will introduce an important GD on the reflected signal. This GD is created by the resonance of the optical field inside the structure which results in a periodic GD response in the spectral band of the mirrors. By carefully designing the reflectivity and position of the weaker mirror, GTEs allow the shaping of the GD variations close to the $\lambda_m$. Similarly to Fabry-Perots, GTEs are realized by superimposed CFBGs. Due to the distributed nature of the CFBGs, this type of GTE is called a distributed Gires-Tournois etalon (DGTE). FIGS. 3A to 3C (PRIOR ART) schematically illustrate the characteristics of a DGTE. In FIG. 3A, two CFBGs with different modulation strengths are shown, photo-induced in an optical fiber but spatially shifted by d along the fiber axis. FIG. 3B represents the relationship between the position along the fiber axis and the local Bragg wavelength, or maximum reflected spectral component of each CFBGs. FIG. 3B also illustrates the resonating cavity mode ($\lambda_m$, $\lambda_{m+1}$, $\lambda_{m+2}$) as well as wavelengths that are not resonating ($\lambda_{am}$, $\lambda_{am+1}$). In FIG. 3C, the GD response of a typical DGTE is illustrated. It is shown that the GD response follows a monotonous slope, induced by the chirp of the CFBGs, on which GD delay peaks appear around wavelengths corresponding to the resonant cavity modes.

Principle of CD Compensator Based on GTE Cascade

The periodic GD response of DGTEs as explained above may advantageously be used to build devices for CD compensation. In the simplest example of such a device, a single DGTE can act as a simple CD compensator when the channel bandwidth is much smaller than the FSR of the DGTE element. However, this solution is not viable for high bit rate data transmission such as 10 Gbit/s, 40 Gbit/s or higher.

Another possibility is to use two GTE or DGTE components in a cascade configuration, with the two components (a) and (b) having opposite chromatic dispersion slope over the channel bandwidth. FIGS. 4A to 4F (PRIOR ART) illustrate the tunability principle. The upper graphs (FIGS. 4A to 4C) show the CD of the individual components and of the cascade, while the lower graphs (FIGS. 4D to 4F) display their respective GD. The GD characteristic of component (a) shows a quadratic dependence on wavelength detuning over a spectral region larger than the channel bandwidth, but smaller than one FSR, while component (b) covers the channel bandwidth. Their cascade results in an almost linear GD as is represented by the dash-dot line which in turn corresponds to a constant CD over the channel bandwidth. As can be seen by comparing the graphs from left to right, a shift of the spectral response of component (a) results in different CD setting over the channel bandwidth. A tunable multi-channel CD compensator can thus be realized because the DGTE can be made with periodic spectral responses with a FSR of 50 GHz, 100 GHz, 200 GHz or any desired channel spacing.

Actual Chromatic Dispersion Compensators Based on the GTE and DGTE Cascade Principle CD dispersion compensation was demonstrated with GTE filters, fabricated with thin film technology, and DGTE filters implemented with CFBGs. The latter case is for example shown in X. Shu, K. Sugden, P. Rhead, J. Mitchell, I. Felmeri, G. Lloyd, K. Byron, Z. Huang, Igor Khrushchev and I. Bennion, "*Tunable Dispersion Compensator Based on Distributed Gires-Tournois Etalons,*" IEEE Photon. Technol. Lett. vol. 15, pp. 1111-1113, August 2003. Published patent application US2003/0210864 (Sugden at al.) also teaches of various DGTE-based devices for CD compensation. However, the proposed DGTE are limited in dispersion range and channel bandwidth.

In X. Shu, Karen Chisholm, and Kate Sugden, "*Design and Realization of Dispersion Slope Compensator Using Distributed Gires-Tournois Etalons,*" IEEE Photon. Technol. Lett. vol. 16, pp. 1092-1094, April 2004, it is clearly demonstrated that CDS compensation is possible when the DGTEs have different values of FSR. However, the CDS is determined by the design and cannot be tuned, although tuning of the nominal CD, which affects the CD of all channels in similar way, remains possible. FIG. 5A (PRIOR ART) shows the CDS of different FSR mismatch while FIG. 5B (PRIOR ART) shows the tuning of the device to different CD settings. It is evident from FIG. 5B that, although the nominal CD value changes, the inter-channel CDS, corresponding to the CD difference between the channels, remains constant.

In X. Shu, J. Mitchell, A. Gillooly, K. Chisholm, K. Sugden and I. Bennion, "*Tunable dispersion Slope compen-* sator using novel tailored Gires-Tournois etalons," in Optical Fiber Communication on CD-ROM (The Optical Society of America, Washington, D.C., 2004), WK5, the CDS tunability is obtained by using DGTE with CFBGs with tailored reflectivity profiles along the fibers axis. This solution does not offer independent tunability of the CDS and of the nominal CD. Furthermore, some channels have a limited dispersion range, as can be observed in FIG. 6 (PRIOR ART) for the channels with the shorter wavelengths.

In D. J. Moss, M. Lamont, S. McLaugthlin, G. Randall, P. Colbourne, S. Kiran and C. A. Hulse, "*Tunable Dispersion and Dispersion Slope Compensators for* 10 *Gb/s Using All-Pass Multicavity Etalons*," IEEE Photon. Technol. Lett. vol. 15, pp. 730-732, May 2003, thin film multi-cavity GTEs allow compensation over a larger CD range. CDS compensation using two GTEs with different FSR has also been demonstrated with this technology. Thin film GTEs have the same limitations as the previously described DGTE design and cannot allow complete inter-channel tunable CD compensator.

Despite all of the technological advancements described above, there is still a need for a versatile device which would allow for the channel per-channel compensation of CD and CDS.

SUMMARY OF THE INVENTION

Accordingly, the present invention provides a device for tailoring the chromatic dispersion of a light signal having a plurality of periodically distributed wavelength channels.

The device includes a plurality of waveguide segments coupled together in a cascade. The waveguides segments are respectively provided with spatially distributed optical filters, which reflect the wavelength channels at different regions along the corresponding waveguide segment. Each optical filter has a spectrally periodic group delay response. The chromatic dispersion of each wavelength channel is determined by the combined group delay response of the optical filters along the regions of the waveguide segments reflecting the wavelength channel of the light signal.

The device further includes a spatially distributed tuning mechanism for independently tuning the group delay response of at least one of the optical filters in each of the regions of the corresponding waveguide segments reflecting the wavelength channels of the light signal.

The present invention provides a device incorporating a tuning technique combined with distributed filter structures which may advantageously be used as a flexible CD compensator. The tunability is preferably based on the distributed aspect of the filters and is obtained with the application of a perturbation of varying strength along the waveguide axis, for example temperature or strain profiles.

The present invention may therefore provide independent CD tuning of adjacent communication channels in a given spectral region. It can therefore adjust the CDS in a monotonous or discrete fashion while providing significant CD compensation over a large dispersion range (for example, ±500 ps/nm or ±1000 ps/nm).

Other features and advantages of the present invention will be better understood upon reading of preferred embodiments thereof with reference to the appended drawings.

BRIEF DESCRIPTION OF THE DRAWINGS

FIGS. 4A to 4C (PRIOR ART) show the CD and FIGS. 4D to 4F show the GD of a cascade of DGTE components (a) and (b); for FIGS. 4A and 4D without spectral shift, for FIGS. 4B and 4E with a shift of Component (a) to longer wavelengths, and for FIGS. 4C and 4F with a shift of Component (a) to shorter wavelengths.

FIGS. 8A and 8B show a case where the inter-channel spacing is equal to the FSR, respectively without and with a spectral shift, and FIGS. 8C and 8D show a case where the inter-channel spacing is twice the FSR, respectively without and with a spectral shift.

FIG. 11A shows a point to point temperature profile applied to a CD compensator according to an embodiment of the invention; FIG. 11B shows the resulting GD of each DGTE, FIG. 11C shows the GD of the cascade, FIG. 11D shows the channel dispersion, and FIG. 11E shows the GDR over the channels' bandwidth.

FIG. 19A shows the GD experimentally obtained by a device according to a preferred embodiment of the invention tuned using a linear temperature gradient; FIG. 19B shows the corresponding CD, FIG. 19C shows the GDR and FIG. 19D shows the FSR of the corresponding resonant cavities.

DESCRIPTION OF PREFERRED
EMBODIMENTS OF THE INVENTION

The present invention provides a device for tailoring the chromatic dispersion of a multi-channel light signal. By "tailoring", it is meant that the present device independently assigns specific dispersion values to each optical channel covered by its spectral response. Although, in the description below, the present invention is mainly applied to the compensation of CD in wavelength-division-multiplexed optical communication systems, it will be understood that the device of the present invention may be used in any context requiring precise control of the spectral band location and shape in multi-wavelength distributed optical devices. One such example is the precise spectral positioning of the transmission peaks of the distributed Fabry Perot proposed in S. Doucet, R. Slavik, Sophie LaRochelle "*High-finesse large Band Fabry-Perot fibre filter with superimposed chirped Bragg Gratings*", Elec. Lett., Vol. 38, no 9, April 2002, pp. 160-160. Since these all-fiber Fabry Perot filters are the basis of the multi-wavelength laser disclosed in Canadian Patent application no. 2,441,916 (Doucet et al.), the present invention can be used to control the spectral position of the laser wavelengths of these structures. Another example concerns the use of the per-channel CD compensator for application as a CD based encoder/decoder in spectrum spread communications like frequency-encoded optical code division multiple access.

Figure 1A:
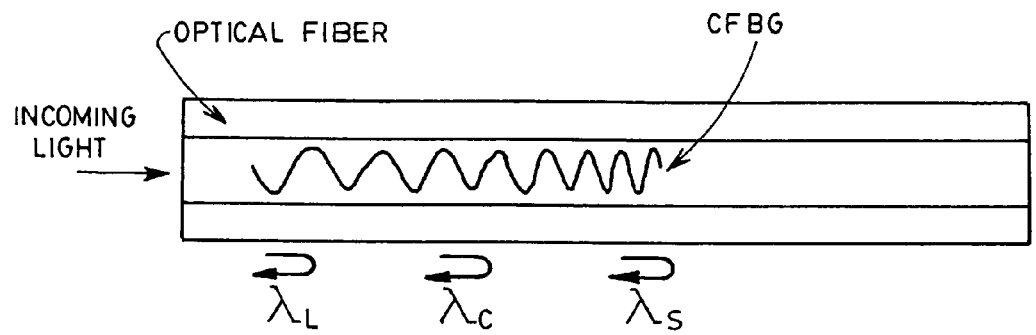
FIGS. 1A and 1B (PRIOR ART) are schematic illustrations of the principle of CD compensation using a CFBG, respectively showing a case with a higher chirp and lower CD and a case with a lower chirp and higher CD.
Figure 1B:
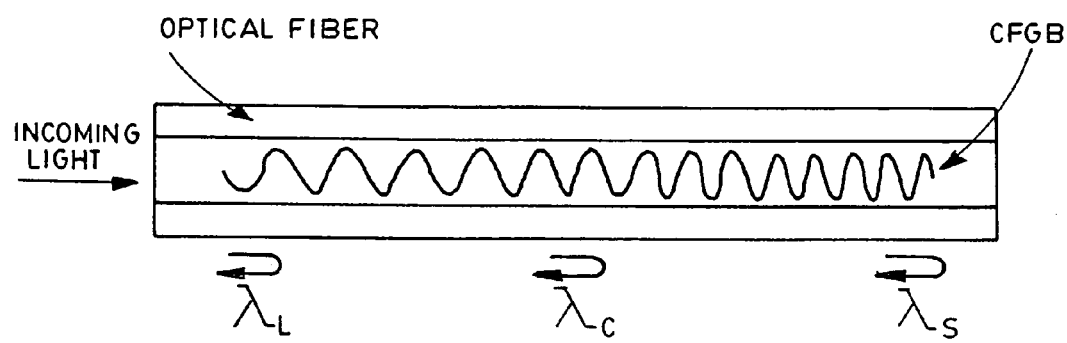
Figure 2A:
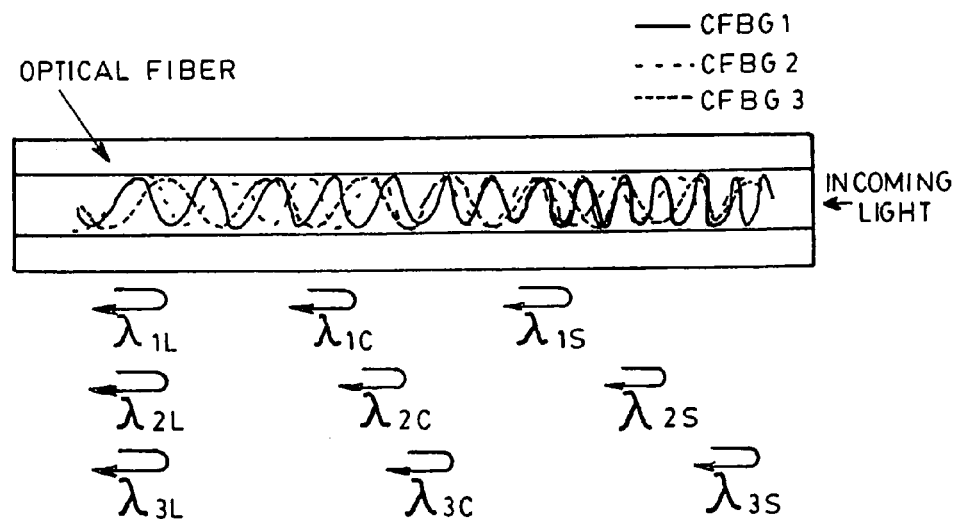
FIG. 2A (PRIOR ART) is a schematic illustration of superimposed single-channel CFBGs with different chirp embodying a multi-wavelength CFBG-based CDS compensator.
Figure 2B:
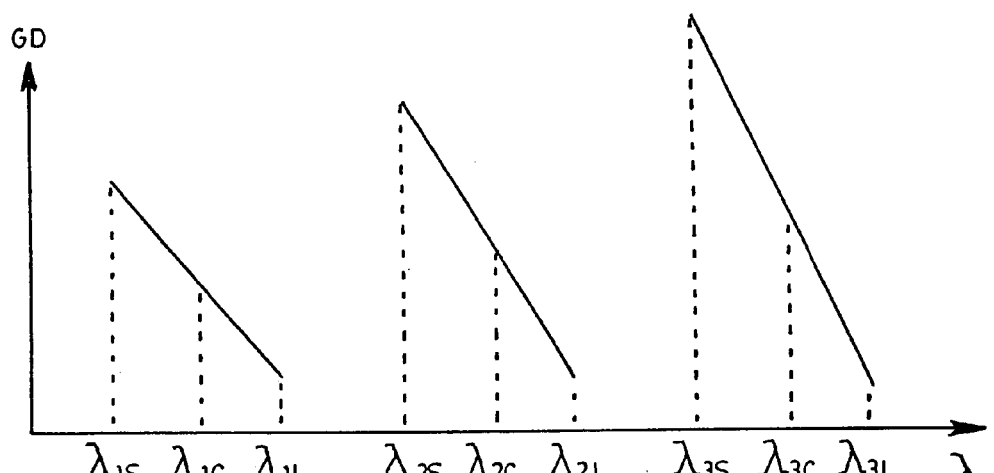
FIG. 2B (PRIOR ART) is a graph of the GD experienced by the respective channels of the compensator of FIG. 2A.
Figure 3A:
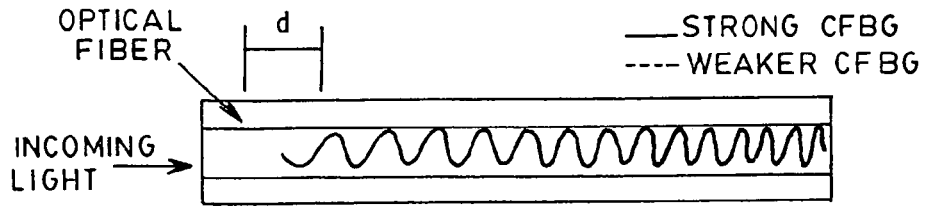
FIG. 3A (PRIOR ART) is a schematic representation of the implementation of a distributed GTE using CFBGs in an optical fiber, FIG. 3B (PRIOR ART) is a graph showing the variation of the Bragg wavelength of the mirrors along the fiber length.
Figure 3B:
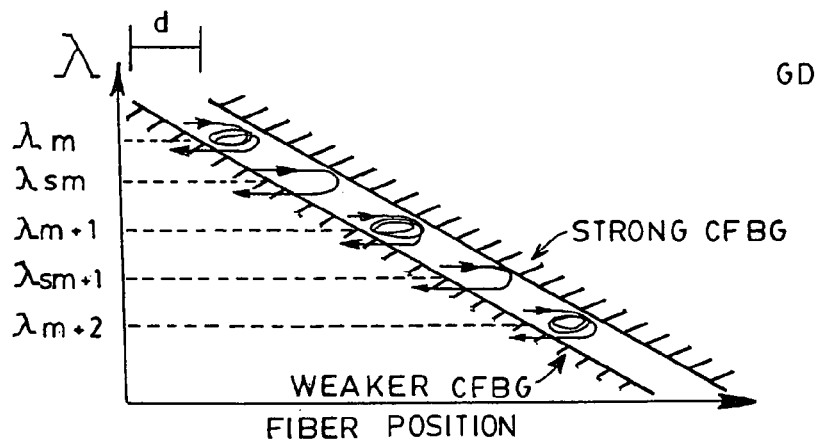
FIG. 3C (PRIOR ART) is a graph showing the GD response of the device.
Figure 3C:
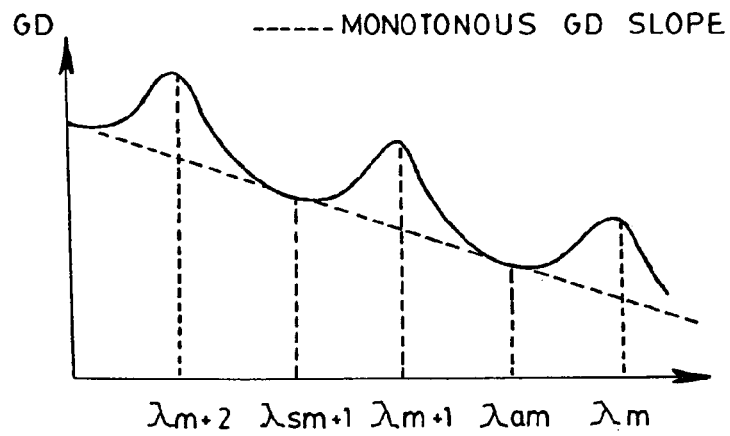
Figure 5A:
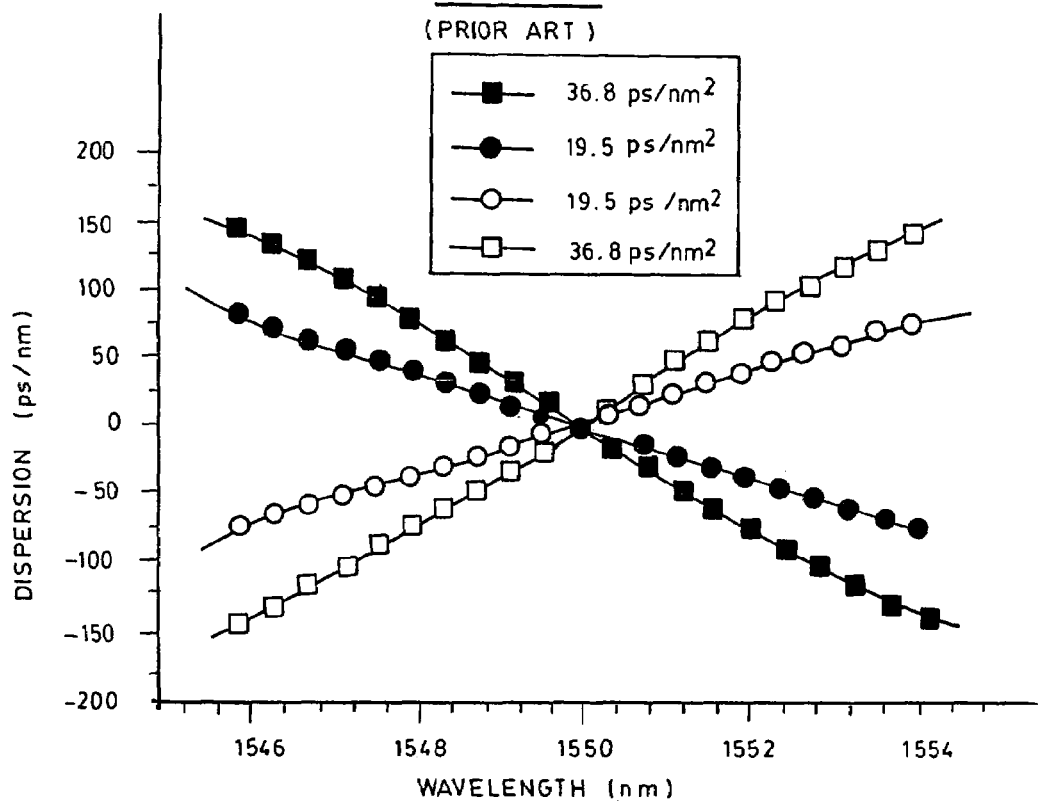
FIG. 5A (PRIOR ART) shows plots of dispersion across channels for designed dispersion slope compensators with different dispersion slope.
Figure 5B:
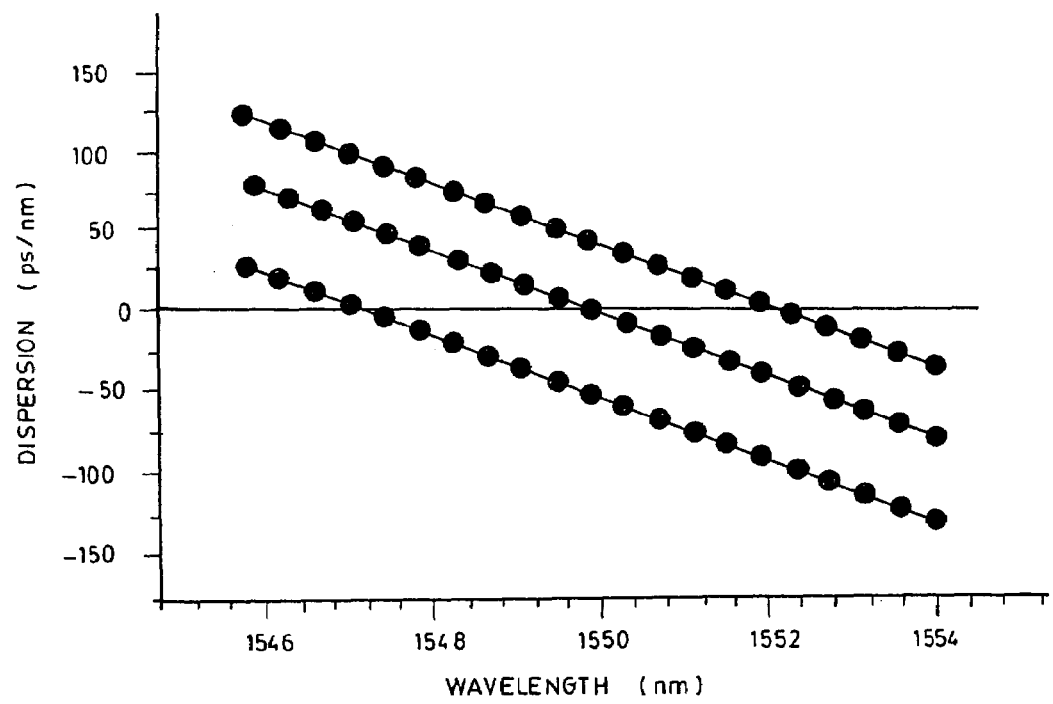
FIG. 5B (PRIOR ART) shows plots of dispersion across channels for a dispersion slope compensator when nominal dispersion varied.
Figure 6:
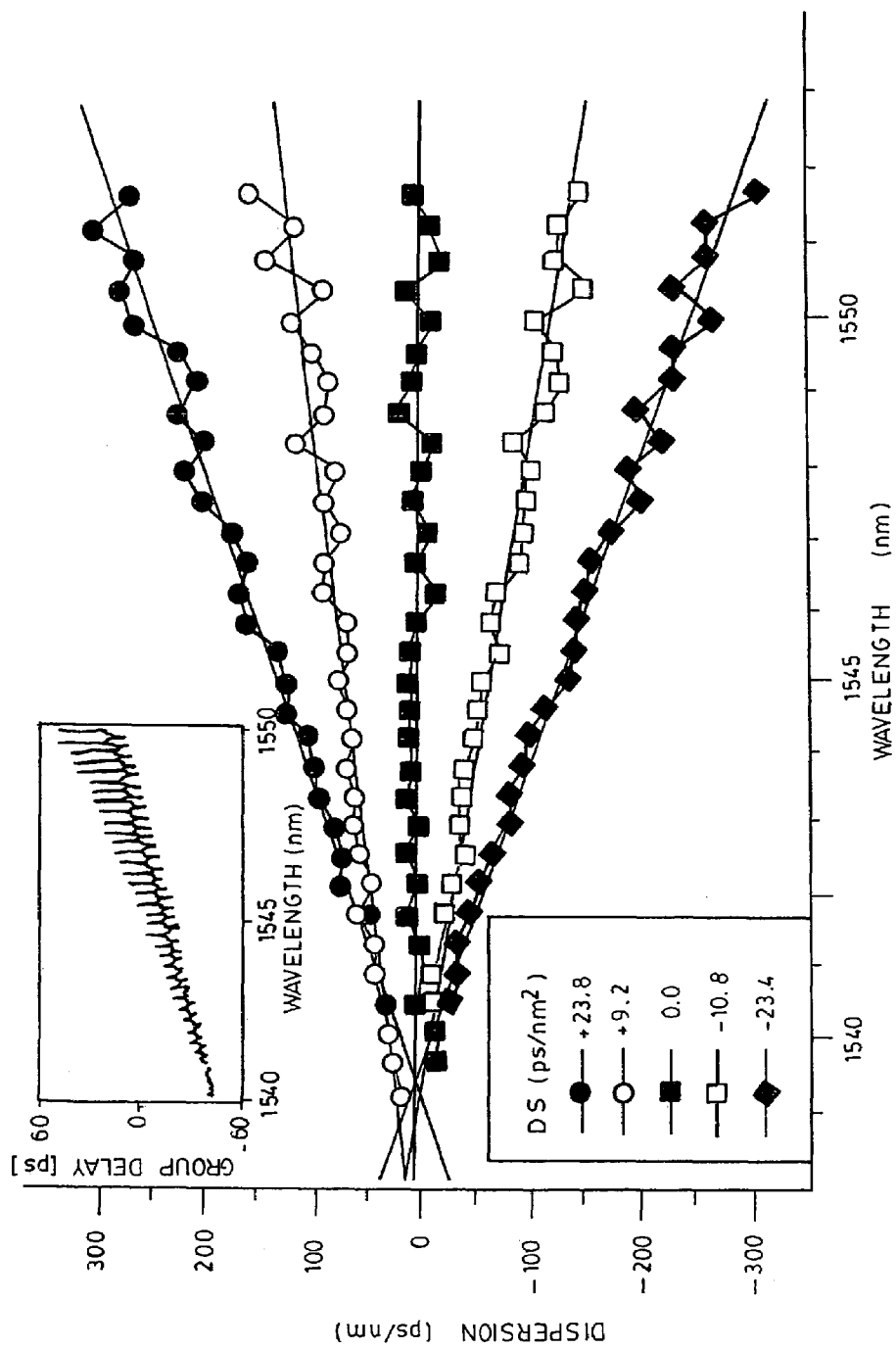
FIG. 6 (PRIOR ART) shows the dispersion as a function of wavelength for different channels of a chromatic dispersion slope compensator using DGTE with CFBGs with tailored reflectivity profiles along the fibers axis.
Figure 7:
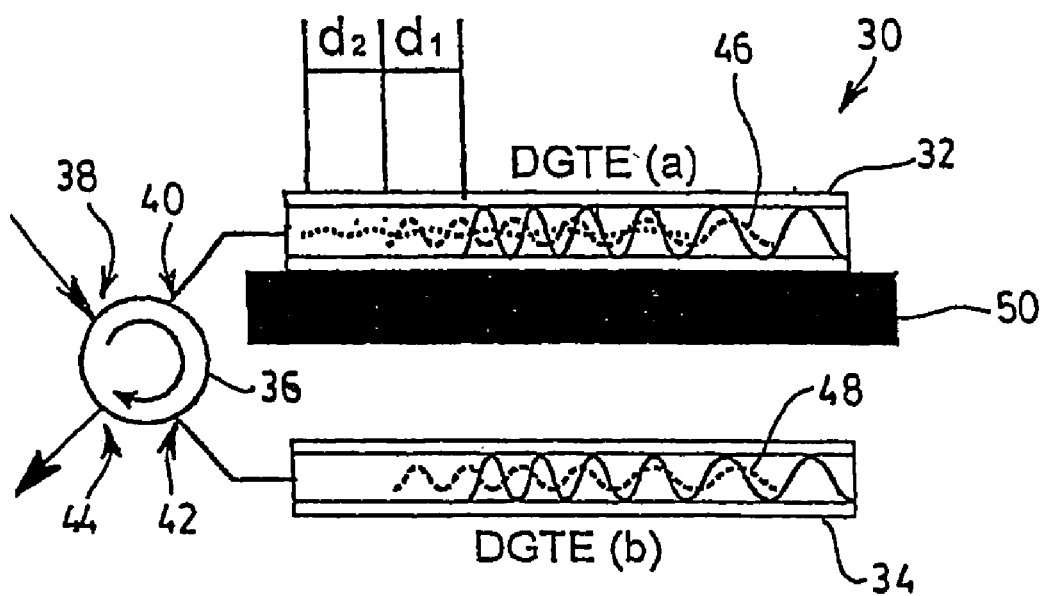
FIG. 7 is a schematic view of a chromatic dispersion compensator configuration according to a preferred embodiment of the invention.

Referring to FIG. 7, there is shown a device 30 according to a preferred embodiment of the invention. The device includes a first waveguide 32 and a second waveguide 34, coupled together in a cascade. The waveguides 32 and 34 are preferably embodied by optical fibers, but of course any appropriate light-guiding structures could be used such as planar or channel waveguides. These waveguides could be fabricated in variety of host materials including silica, fluoride or chalcogenide glasses, semi-conductors, organic materials and polymers. The first and second waveguides 32 and 34 need not be both of the same type. In the illustrated embodiment, a 4-ports optical circulator 36 couples the waveguides 32 and 34 together, and has an input port 38 for receiving the light signal to be processed, a port 40 connected to the first waveguide 32, a port 42 connected to the second waveguide 34, and an output port 44. It will be understood, however, that the optical circulator 36 could be replaced by any optical arrangement allowing the input light signal to sequentially propagate through the first and second waveguides 32 and 34 such as 3-ports circulators or a combination of couplers and isolators.

It will be further noted that although the configuration shown in FIG. 7 implies that both waveguides 32 and 34 are used in reflection, the present invention could also be embodied in a configuration in transmission. In addition, it will be understood that although the present description only shows two waveguides and two corresponding filters, the present invention could equally be embodied by any number of waveguides segments in a cascade, each provided with a corresponding optical filter contributing to the total chromatic dispersion of the device. The different waveguide segments could be part of different waveguides or even provided within a same waveguide.

The first and second waveguides 32 and 34 are respectively provided with first and second optical filters 46 and 48. The optical filter 46 and 48 are spatially distributed in such a manner that they reflect the wavelength channels of the light signal at different regions along the corresponding waveguide 32 and 34. Each optical filter 46 and 48 has a spectrally periodic group delay response. The distributed optical filters 46 and 48 could be DGTEs based on two or more partially superimposed CFBGs such as explained above, or FBG superstructures which have complex amplitude apodisation and/or complex period profiles, and are spectrally designed to produce the desired group delay response. The resulting chromatic dispersion of each channel is determined by the combined group delay response of the two optical filters 46 and 48 along the regions of the waveguides 32 and 34 reflecting this channel. By using filters with spectrally periodic group delay responses, the chromatic dispersion of a given channel is thus set by the spectral displacement between the group delay periods of the optical filters relative to the channel spectral position.

In the illustrated embodiments and explanations below, the operating principle of a device according to a preferred embodiment of the invention is discussed using as an example two DGTEs. However, the filter elements could be any FBG superstructures, i.e. FBG with complex amplitude and/or complex period profiles along the waveguide axis, provided that the element provides partially separated "resonating cavities" for the different channels. The reference to "resonant cavities" facilitates the conceptualization of the device, but it will be understood that the optical filters need not be fabricated with this analogy in mind; what matters is the desired group delay response and spatial distribution. It will be noted that in order to obtain the requisite optical characteristics of the filters used in the present invention, the obtained structures will most likely be longer than prior art devices as explained above, so that the "resonated" cavities that generate the GD peaks are spatially separate.

In the preferred embodiment of the invention, the FBG filters are photo-induced in an optical fiber through UV exposure. It will be however understood that the filters according to the present invention could result from various fabrication techniques such as writing by photo-exposure or lithographic and etching processes.

The device 30 according to the present invention further includes a spatially distributed tuning mechanism for independently tuning the group delay response of the first, the second or both optical filters 46 and 48 in each region of the corresponding waveguide 32 or 34 corresponding to a given wavelength channel. The tuning mechanism is embodied by any system applying a perturbation of varying strength along the optical propagation axis of the corresponding waveguide which affects its local properties, such as the optical length and grating period. The perturbation may be monotonous or discontinuous, depending on the desired resulting CD profile. In the illustrated embodiment, the tuning mechanism is embodied by the generation of a thermal profile along the fiber axis. It is however understood that other than thermal, the perturbation could also result from the application of a strain profile, or from the application of electric or magnetic field profiles if the waveguide or its substrate present the appropriate response (electro-optic, magneto-optic, electrostrictive or magnetostrictive) or even current injection profiles in the case of semiconductor devices.

The present invention is therefore based on the combination of the tuning mechanism, providing a perturbation along the propagation axis of a waveguide, and of a distributed filters written in one of the optical waveguide. The filters provides "resonant cavities" which induce dispersion at the channel wavelengths. The cavities of the tuned filter are distributed along the optical waveguide axis such that they are either partially overlapping or totally separated. The other filter may be fixed or tunable, or be embodied by one or more fixed or tunable elements producing the desired group delay response.

Still referring to FIG. 7, the illustrated implementation of the device 30 according to a preferred embodiment of the invention will be described in more detail. In this embodiment, the first optical filter is a DGTE (a) having two coupled-cavities, and the second optical filter 48 is a DGTE (b) having one cavity. The use of a coupled-cavity DGTEs increases the CD tuning range by offering more degrees of freedom on the GD shaping for larger channel's bandwidth. Tuning is realized by a thermal holder 50, extending along the DGTE (a), which imposes a profiled temperature control along the fiber axis. In a variant, another thermal holder could be use on the DGTE (b) to do a fine-tuning on the spectral channel's center position.

The applied perturbation modifies the properties of the first waveguide 32 including the optical lengths of the cavities and the local grating period. These changes are induced through thermo-optic and dilatation effects. Since the first optical filter 46 is distributed, each peak of the spectrally periodic GD is related to a specific position along the optical axis of the waveguide filter. The profiled perturbation therefore affects differently each period of the GD curve. The GD peaks of the tuned first filter 46 are shifted by different amount relatively to the spectral response of the second filter 48. The channels' dispersion setting, induced by the spectral shift, is thus a function of the profiled perturbation.

Figure 8:
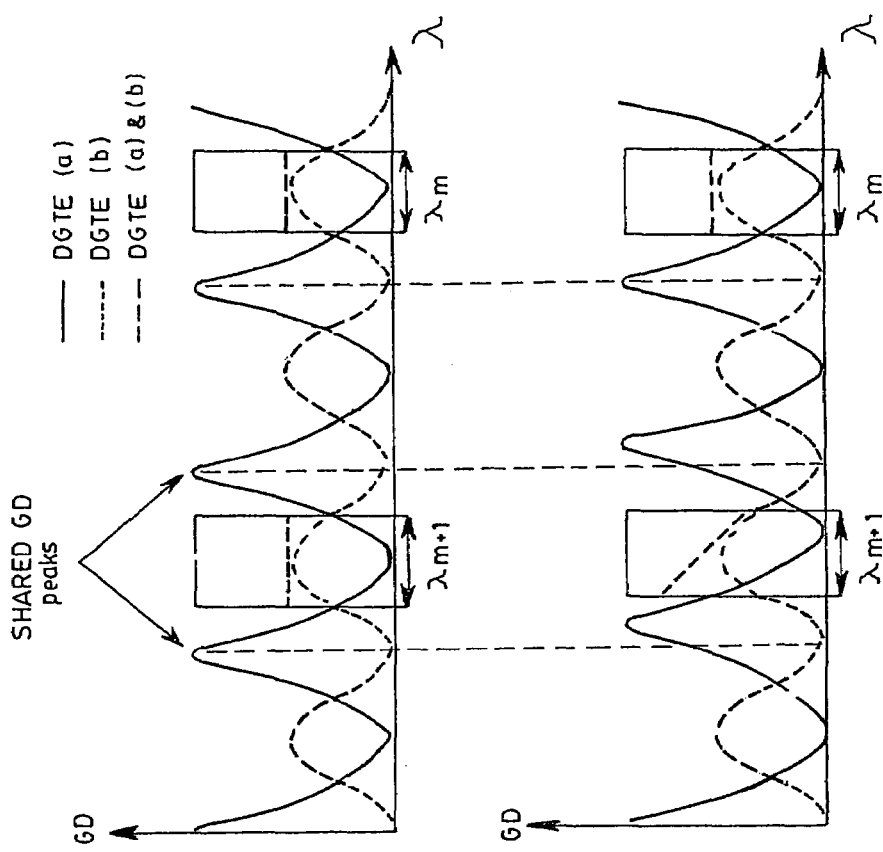
FIGS. 8A to 8D illustrate the CD tuning for neighboring channels according to another embodiment of the invention.

With long distributed optical structure, it is possible to control independently the spectral position of each GD peak without affecting the neighboring peaks. However, when the FSR of the device is equal to the inter-channel spacing (ICS), independent positioning of the GD peaks is not sufficient to ensure independent CD tuning of neighboring channels. Indeed, each GD peak affects the dispersion of the two adjacent channels located on its shorter and longer wavelength sides. FIGS. 8A and 8C illustrate this situation (the monotonous GD slope is not represented in the figure). In FIG. 8C, it can be seen that the spectral shift of the GD peaks induced to tune the CD of the channel $\lambda_{m+2}$, affects the neighboring optical channels when ICS=FSR. To overcome this coupling effect and to obtain a truly multi-wavelength per-channel CD compensator, it is possible to use a distributed filter element with a FSR, corresponding to the spectral spacing between consecutive peaks of the group delay response, which is half the inter-channel. This situation is depicted in FIGS. 8B and 8D where the tuning of channel $\lambda_{m+1}$ is achieved without affecting the neighboring channels. This configuration also allows larger excursion of the CD between neighboring channels. When this excursion is smaller, the use of a distributed filter element with FSR equal to the channel spacing can be sufficient to provide tuning of the CD and CDS.

Preliminary Design Considerations

The tunability of the device according to the present invention is based on the distributed property of the optical filters. For optical filters based on coupled-cavity DGTEs, spatial independence of the resonant cavity modes depends on the cavity length, related to the desired FSR, the number of cavities and the underlying grating chirp. A simple design approach for the DGTEs consists of considering point mirror equivalence for each CFBG. Although this approach neglects the penetration depth of the light in the CFBG, it can be used to estimate the maximum CFBG chirp, $C_{max}$, to be used for a given number of cavities. We find $$C_{max} \approx \frac{FSR_\lambda^2}{N_C \lambda^2} \qquad (6)$$

where $FSR_\lambda$ is the FSR expressed in units of wavelength, $N_c$ is the number of cavities and $\lambda$ is the central wavelength of the spectral band of interest. For a two-cavity design, with a $FSR_\lambda$ of 0.4 nm ($FSR_v$=50 GHz), the maximum chirp of the grating period is equal to 0.333 nm/cm.

Figure 9:
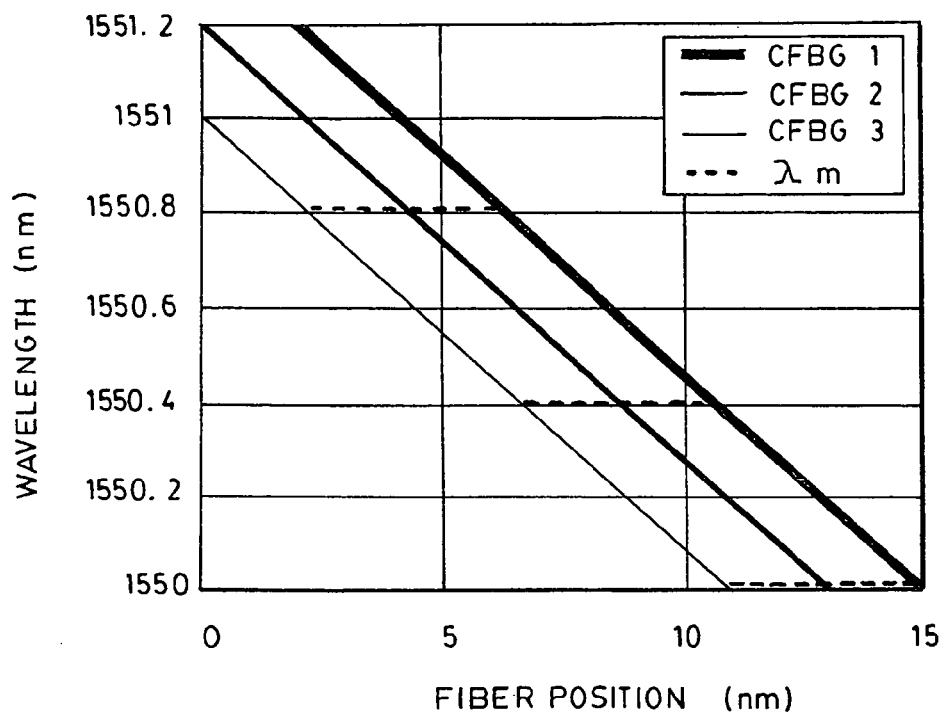
FIG. 9 shows CFBGs mirror positions for a chirp of 0.344 nm/cm.
Figure 10:
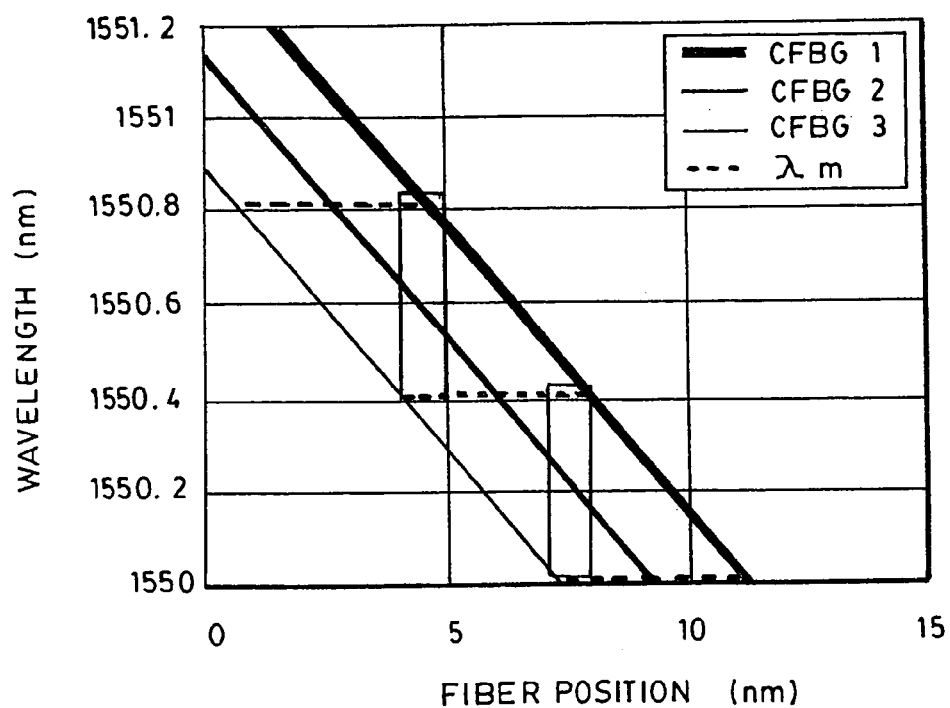
FIG. 10 shows CFBGs mirror positions for chirp of 0.425 nm/cm.

FIG. 9 shows the mirrors' position along the fiber and the corresponding position of a few resonant cavity modes (dashed lines) for a two-coupled cavity (three-mirror) design. FIG. 10 shows the situation when the chirp is greater than $C_{max}$: a spatial overlap occurs between neighboring resonant cavities (gray rectangle) and, as a consequence, temperature controls located at the z=4 mm and z=7.5 mm affect two GD peaks simultaneously.

For a given CFBG length, L, and $FSR_\lambda$, the maximum number of channels, $N_{ch}$, is related to the CFBG chirp in (7).

$$N_{ch} \leq \frac{2n_{ave}LC_{max}}{FSR_\lambda} \qquad (7)$$

Compensation of high CD values and tuning over a large CD range require a higher number of coupled cavities, which consequently limits the grating chirp through (6) and, as a result, the number of channels covered by the CD compensator for a given length through (7).

It should be noted that although this schematic representation of DGTE is useful as an initial design step, the final design is accurately determined by CFBG simulations using transfer matrix method based on coupled modes theory (see T. Erdogan, "*Fiber Grating Spectra*," IEEE J. Lightwave Technol. vol. 15, pp. 1277-1294, August 1997, where the superstructure grating is calculated by superimposition of refractive index modulations of the CFBGs.

Per-Channel CD Compensator (CD Equalizer)

As explained above, the selection of a channel's CD is realized by shifting the spectral response of two filters placed in a cascade, i.e. by shifting the position of the GD peaks of the first filter with respect to those of the second filter. As also explained, truly independent per-channel CD compensation can be achieved by using distributed filter devices with FSR that are half the channel spacing. In the following example, we perform simulations using the DGTE specifications presented in Table 1.

TABLE 1

| | DGTE parameters | |
|---|---|---|
| | DGTE (a) | DGTE (b) |
| Chirp | −0.25 nm/cm | 0.25 nm/cm |
| L | 95 mm | 95 mm |
| $\Delta n_1$ | $3.65 \times 10^{-4}$ | $3.65 \times 10^{-4}$ |
| $\Delta n_2$ | $1.13 \times 10^{-4}$ | $0.41 \times 10^{-4}$ |
| $\Delta n_3$ | $0.2 \times 10^{-4}$ | |
| $d_1$ | 2 mm | 2 mm |
| $d_2$ | 1.999975 mm | |

Figure 12A:
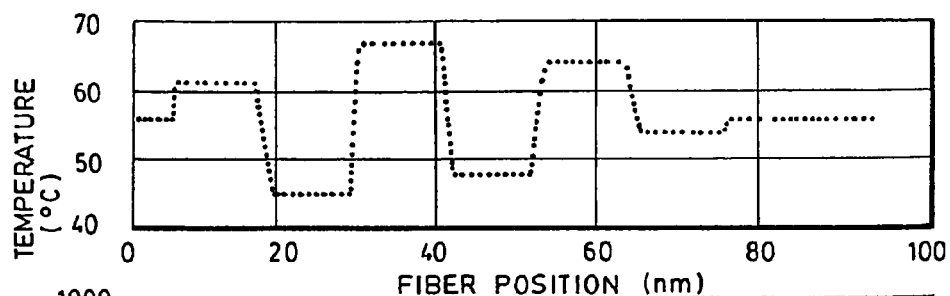
FIG. 12A shows another point to point temperature profile applied to a CD compensator according to an embodiment of the invention.
Figure 12B:
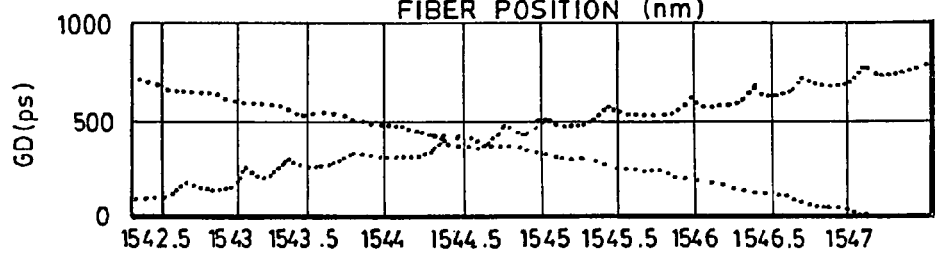
FIG. 12B shows the resulting GD of each DGTE.
Figure 12C:
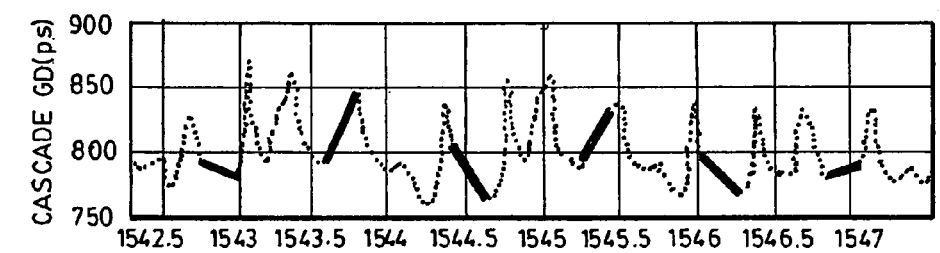
FIG. 12C shows the GD of the cascade.
Figure 12D:
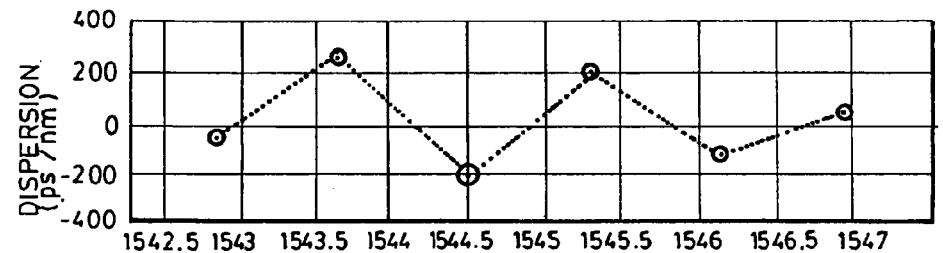
FIG. 12D shows the channel dispersion.
Figure 12E:
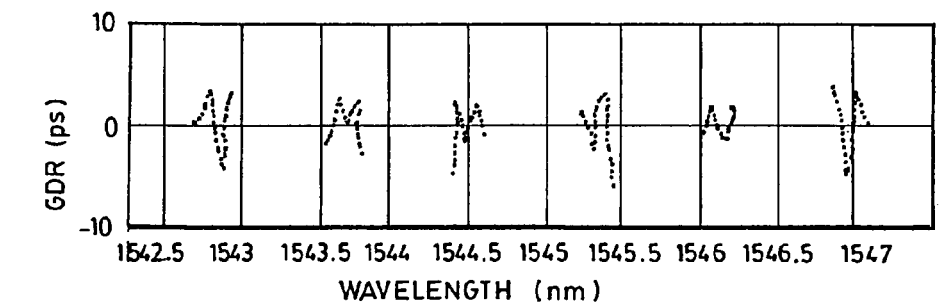
FIG. 12E shows the GDR over the channels' bandwidth.
Figure 13A:
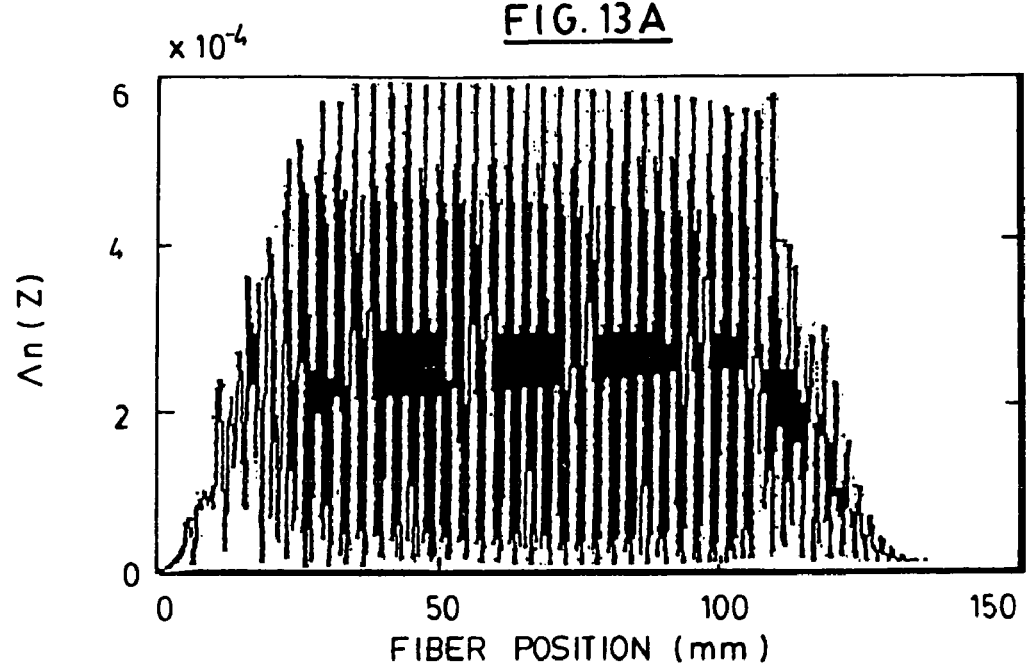
FIG. 13A shows the index modulation of a superstructured CFBG for use in an embodiment of the present invention.
Figure 13B:
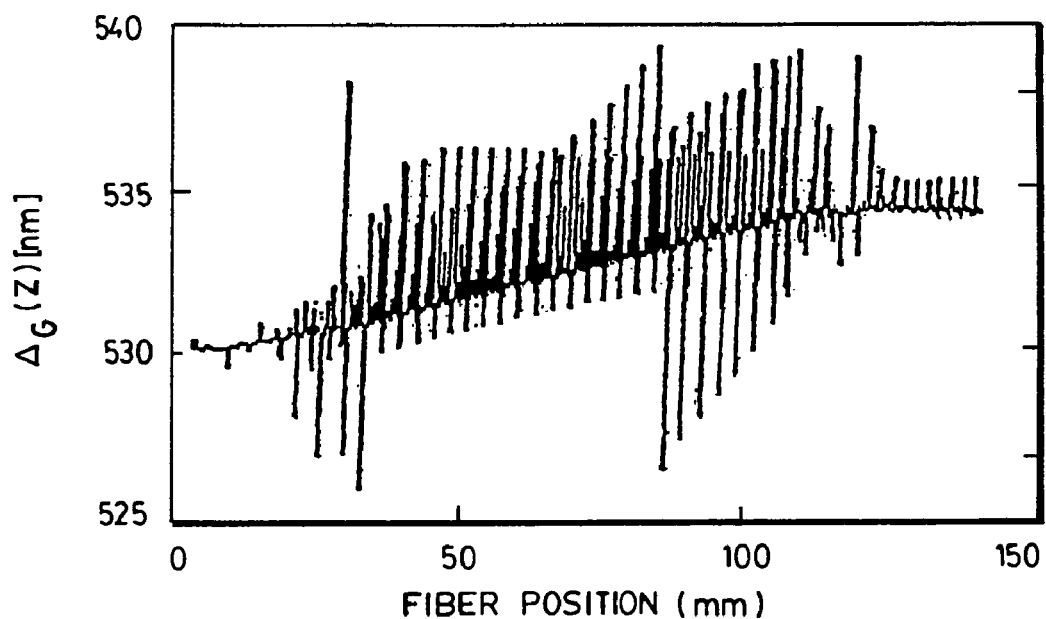
FIG. 13B shows the local period of the superstructured CFBG of FIG. 13A.
Figure 14A:
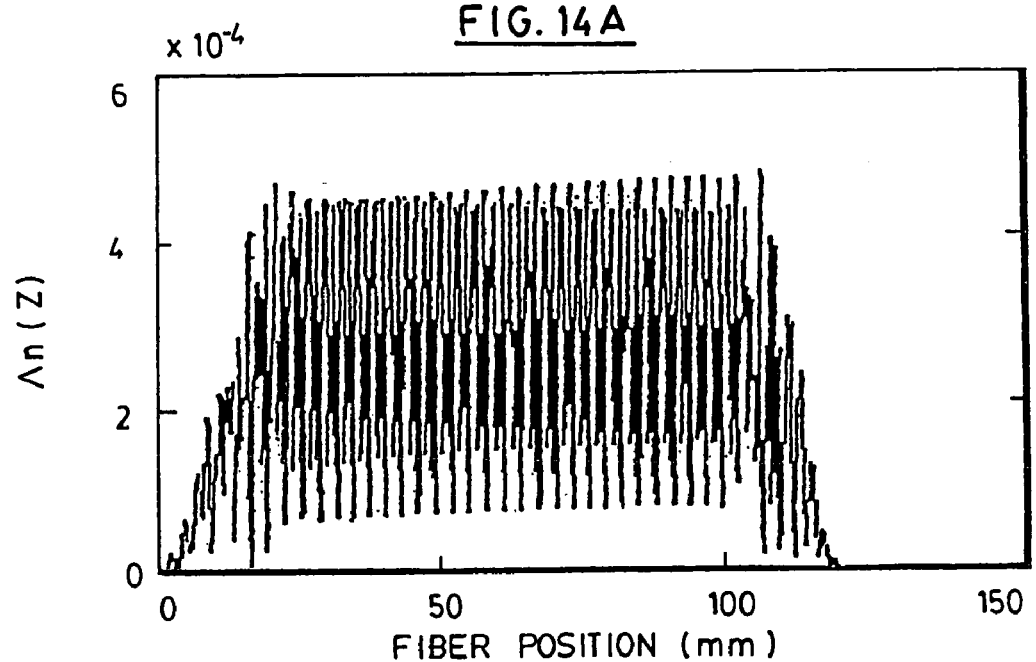
FIG. 14A shows the index modulation of another superstructured CFBG for use in an embodiment of the present invention.
Figure 14B:
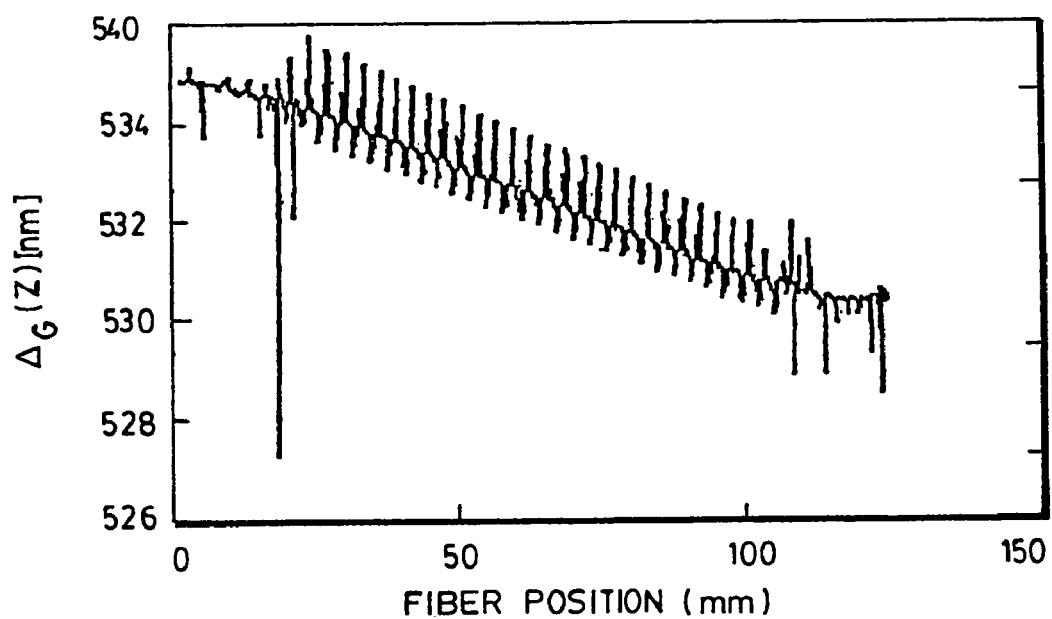
FIG. 14B shows the local period of the superstructured CFBG of FIG. 14A.
Figure 15A:
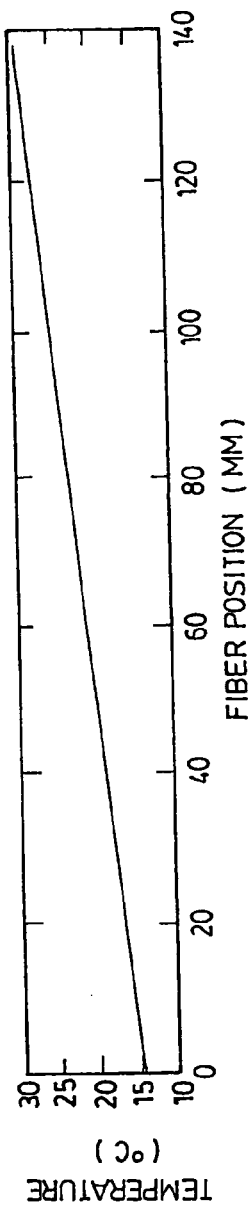
FIG. 15A shows a linear temperature profile with a positive slope applied to a CD compensator according to an embodiment of the invention.
Figure 15B:
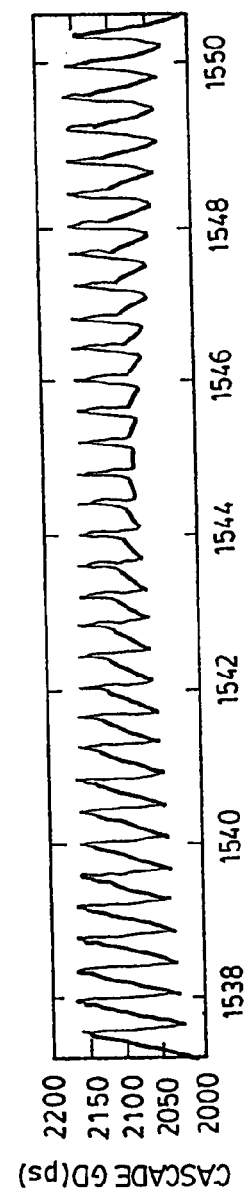
FIG. 15B shows the resulting GD of the FBG cascade.
Figure 15C:
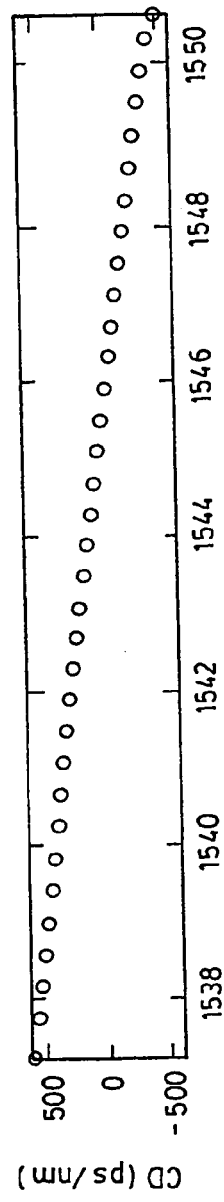
FIG. 15C shows the resulting channel dispersion.
Figure 15D:
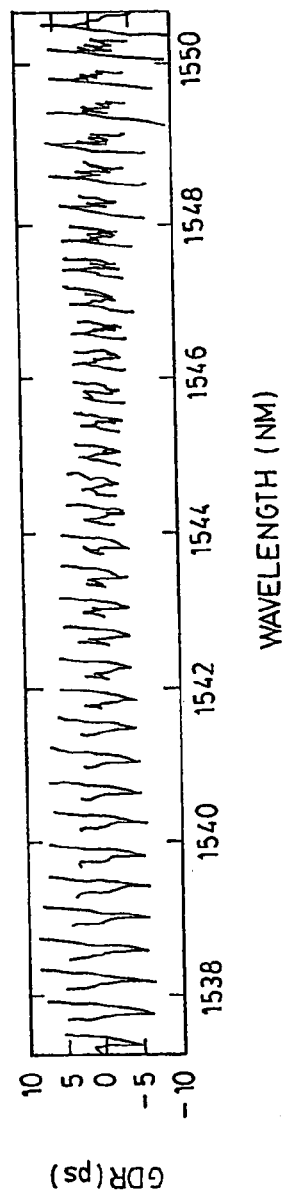
FIG. 15D shows the resulting GDR over the channels' bandwidth.
Figure 16A:
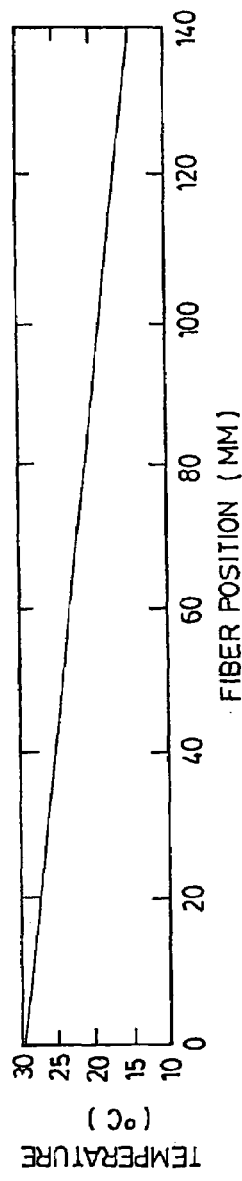
FIG. 16A shows a linear temperature profile with a negative slope applied to a CD compensator according to an embodiment of the invention.
Figure 16B:
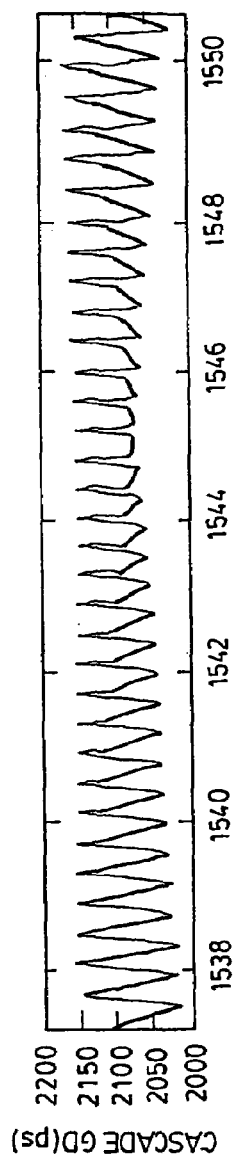
FIG. 16B shows the resulting GD of the FBG cascade.
Figure 16C:
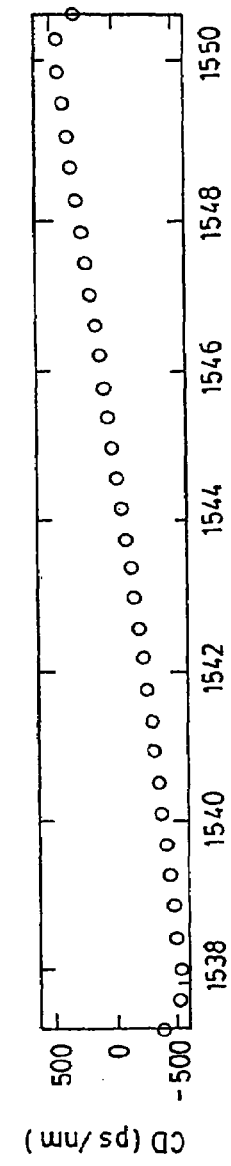
FIG. 16C shows the resulting channel dispersion.
Figure 16D:
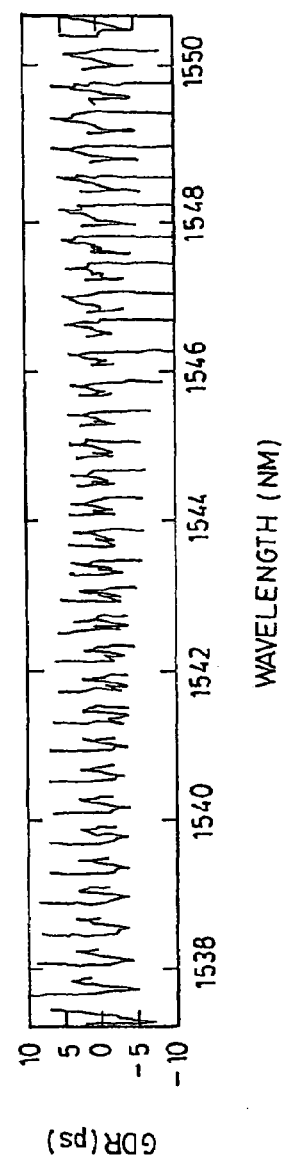
FIG. 16D shows the resulting GDR over the channels' bandwidth.
Figure 17A:
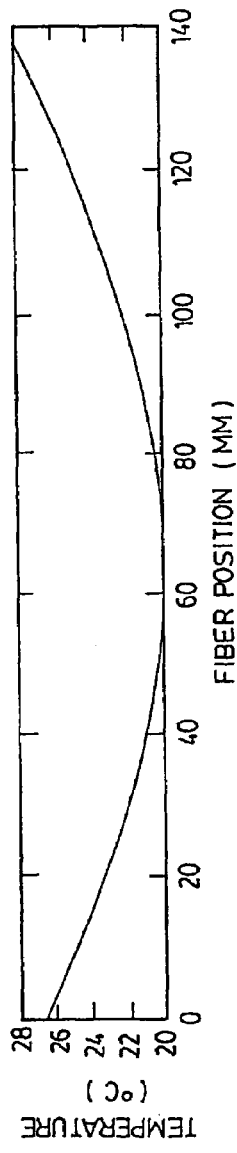
FIG. 17A shows a quadratic temperature profile with a positive curvature applied to a CD compensator according to an embodiment of the invention.
Figure 17B:
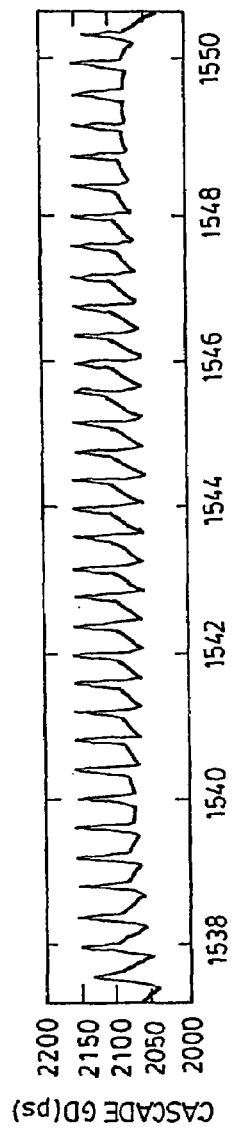
FIG. 17B shows the resulting GD of the FBG cascade.
Figure 17C:
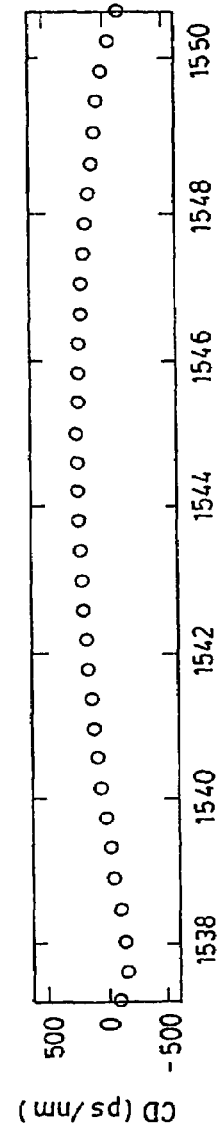
FIG. 17C shows the resulting channel dispersion.
Figure 17D:
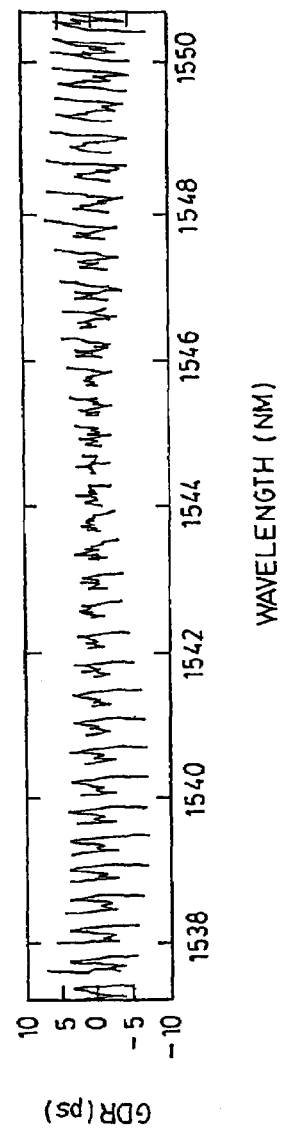
FIG. 17D shows the resulting GDR over the channels' bandwidth.
Figure 18:
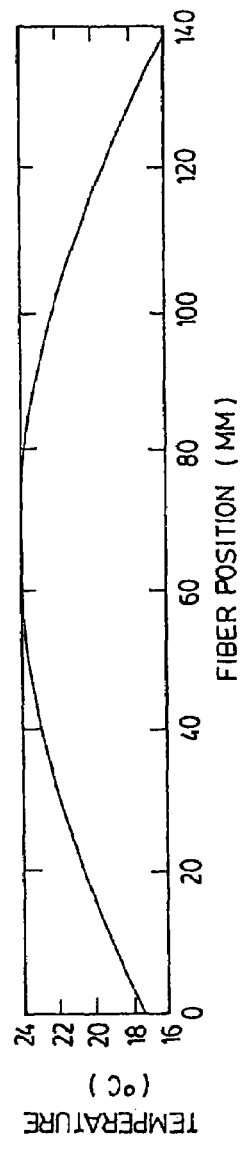
FIG. 18A shows a quadratic temperature profile with a negative curvature applied to a CD compensator according to an embodiment of the invention.
FIG. 18B shows the resulting GD of the FBG cascade.
FIG. 18C shows the resulting channel dispersion.
FIG. 18D shows the resulting GDR over the channels' bandwidth.
Figure 18:
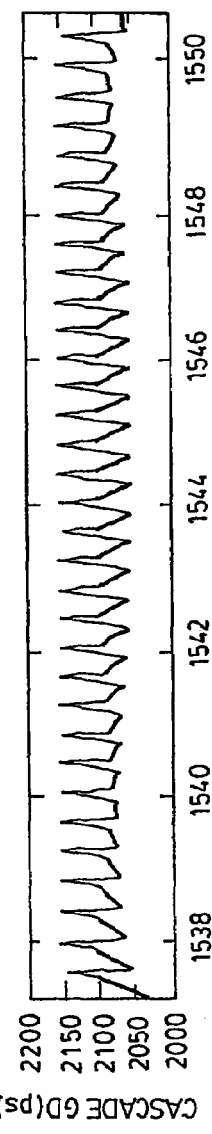
Figure 18:
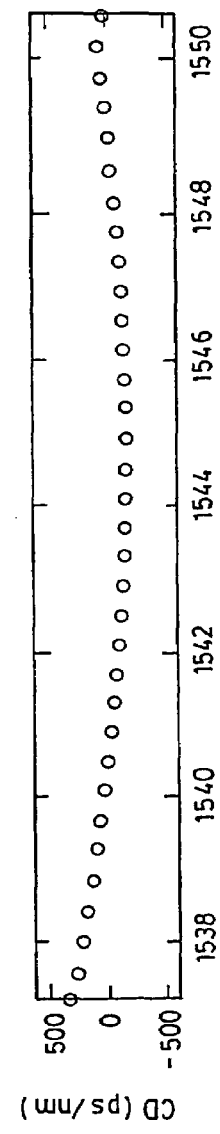
Figure 18:
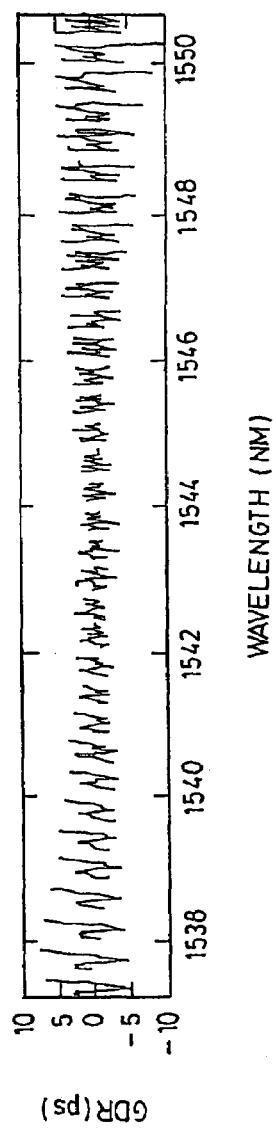

FIGS. 11A to 11E and FIGS. 12A to 12E show the simulation results of the per-channel CD compensator for two different temperature profiles. FIGS. 11A and 12A show the point-to-point temperature profile along the fiber axis, while FIGS. 11B and 12B show the GD of each DGTE. The GD of the cascade is displayed in FIGS. 11C and 12C with a linear fit over the respective channel bandwidth. The slope of this linear fit is the dispersion, plotted in FIGS. 11D and 12D for each channel, while the deviation of the GD from the linear fit is the group delay ripple (GDR) shown in FIGS. 11E and FIG. 12E. These results demonstrate that it is possible to introduce flexible CDS tuning over the spectral band of interest due to the independence of the CD setting for each channel. This device can therefore act as a dynamic dispersion equalizer.

Wideband CD Compensator

When the spectral band covered by a device of a given length is increased while maintaining the CD tuning range, the cavities of the neighboring modes begin to overlap spatially. Consequently, inter-channels CD difference is limited for these wideband devices. However, this not a limitation when a smooth CD profile is needed over the spectral band covered by the filter. Moreover, the small inter-channel CD difference allows the use of filter elements with FSR corresponding to the channel spacing because two channels can share one GD peak of the optical filter (a) without constraint. The following results are based on the CD compensator architecture proposed in FIG. 7. The optical filters are FBG superstructures with complex amplitude and period profiles as can be seen in FIGS. 13A and 13B and FIGS. 14A and 14B.

FIG. 15A to 15D, 16A to 16D, 17A to 17D and 18A to 18D show the results of numerical simulations of a CD compensator according to the preferred embodiment of the present invention for different temperature profiles. These results demonstrate that the temperature profile is an inverse image of the obtained CD profile over the entire optical band. A modification of the mean temperature affects the nominal CD value, while a temperature gradient changes the CD shape over the entire spectrum.

Experimental Results

Experimental results have been obtained by the inventors and are demonstrated in S. Doucet, R. Slavik, S. LaRochelle, "*Tunable dispersion slope compensator using novel Gires-Tournois Bragg grating coupled cavities*," IEEE Photon. Technol. Lett. vol. 16, no. 11., pp. 2529-2531 November 2004 for a temperature gradient profile applied on one element of a DGTE cascade as proposed in FIG. 7. The thermal holder is made with two thermoelectric elements joined by an aluminum plate on which the fiber is placed. FIGS. 19A to 19D show the results for 10 channels. More particularly FIG. 19B demonstrates the CDS tunability with temperature gradients ($\delta T/\delta z$) of $\pm 1°$ C./mm.

Figure 20:
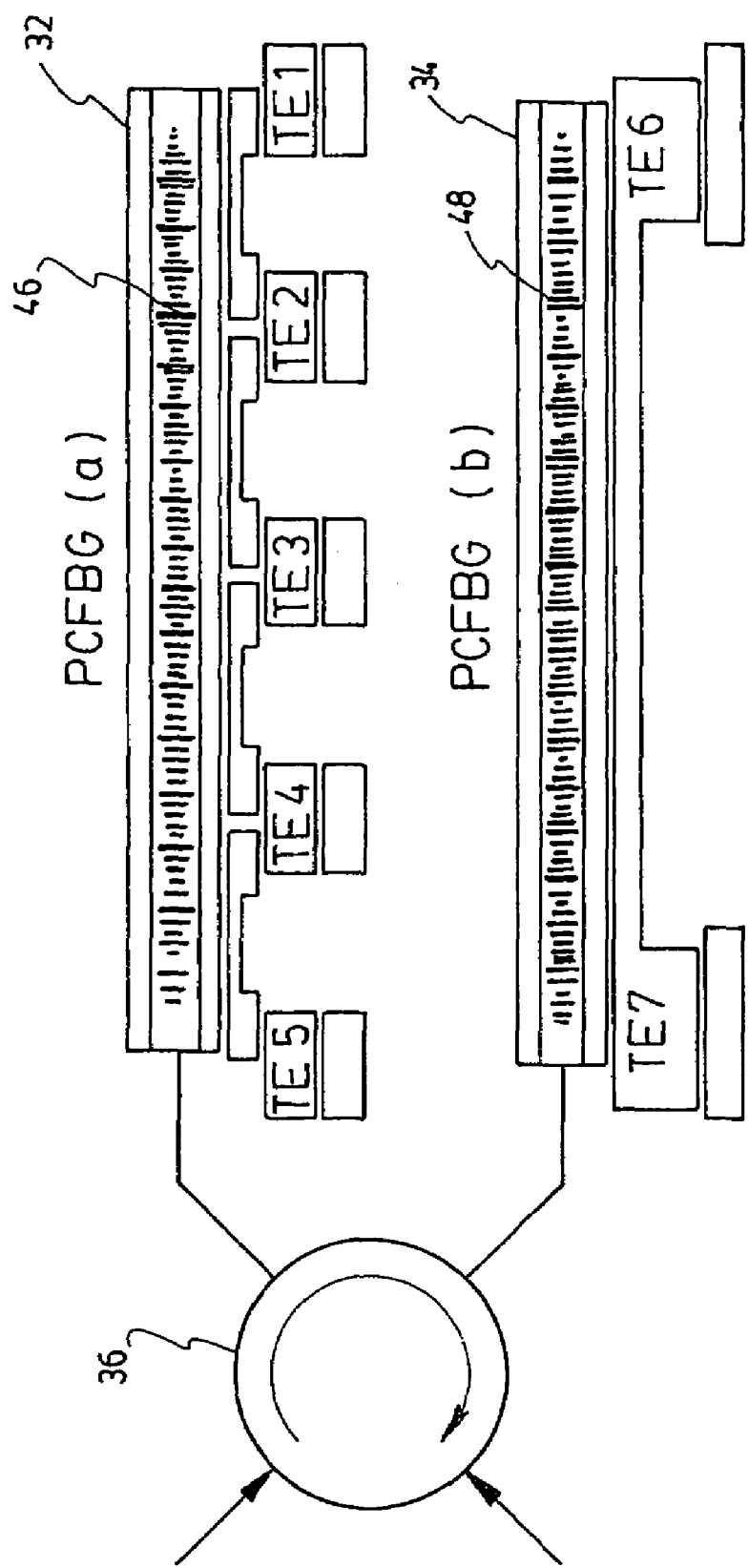
FIG. 20 is a schematic illustration of a device according to an embodiment of the invention.

Referring to FIG. 20, there is shown a variant to the above described device according to a preferred embodiment of the invention. In this device, the thermal profile tuning the first optical filter 46 is induced by creating 4 successive temperature gradients defined by 5 thermoelectric elements (TE1 to TE5) placed along the fiber holder. Thermoelectric elements are also placed on the holder of the second optical filter 48 to allow tuning and stabilization of the spectral position of the channels.

Figure 21A:
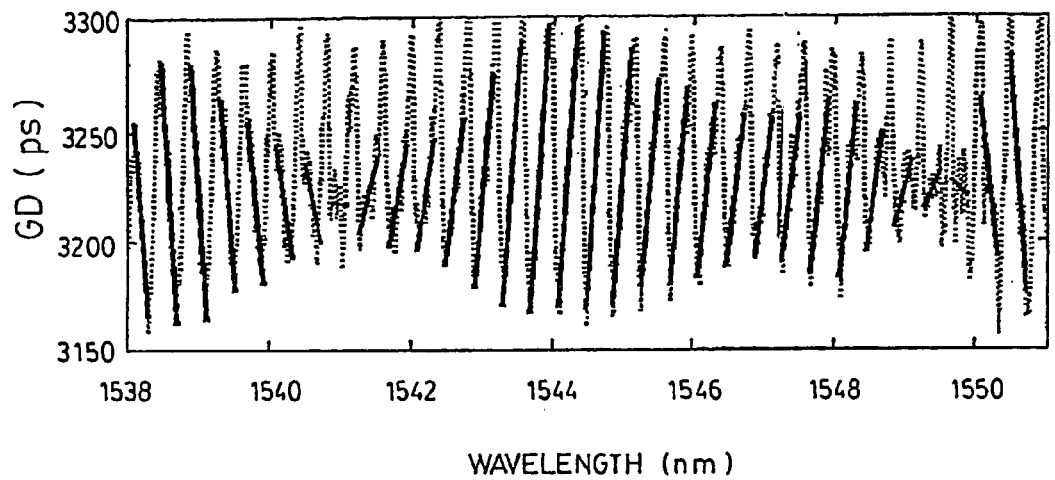
FIG. 21A is a graph showing experimentally obtained results for the GD using a segmented temperature profile defined by a serie of linear temperature gradient with the device of FIG. 20.
Figure 21B:
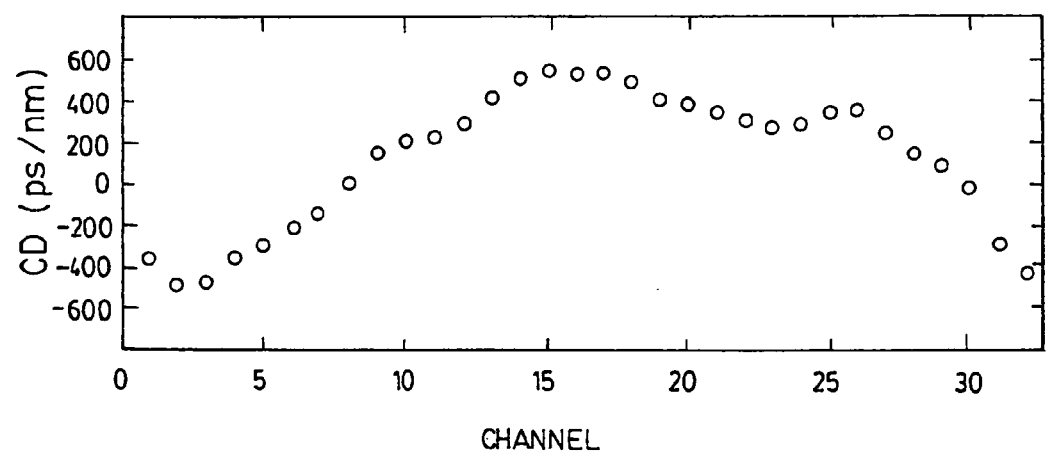
FIG. 21B shows the corresponding CD.
Figure 22A:
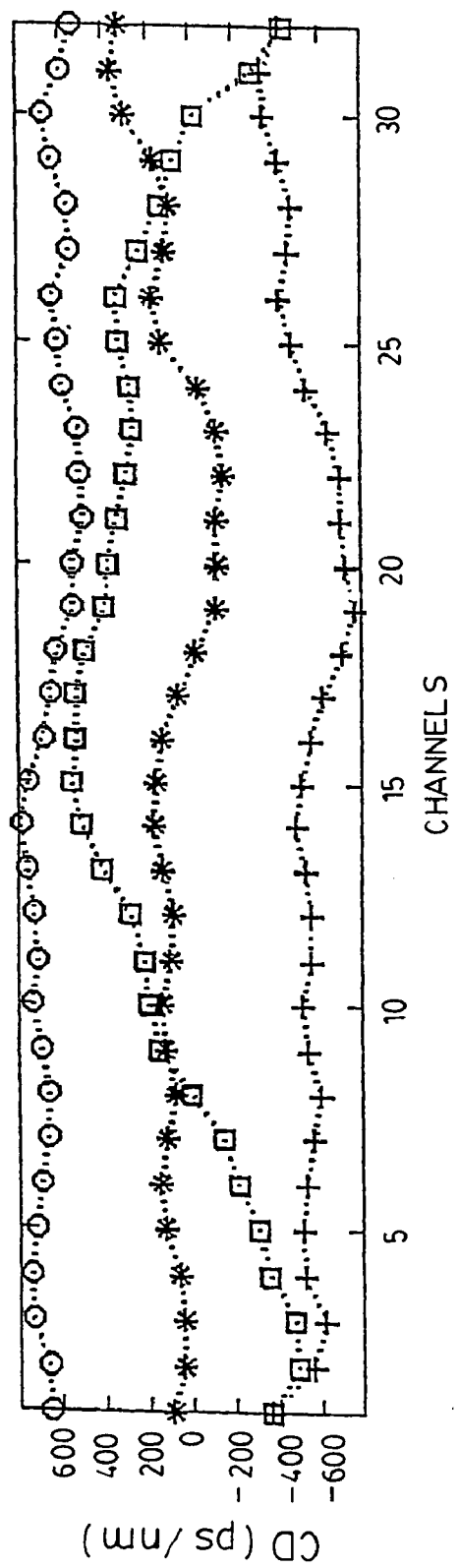
FIG. 22A is a graph showing the experimentally obtained CD with the device of FIG. 20 using various temperature profiles.
Figure 22B:
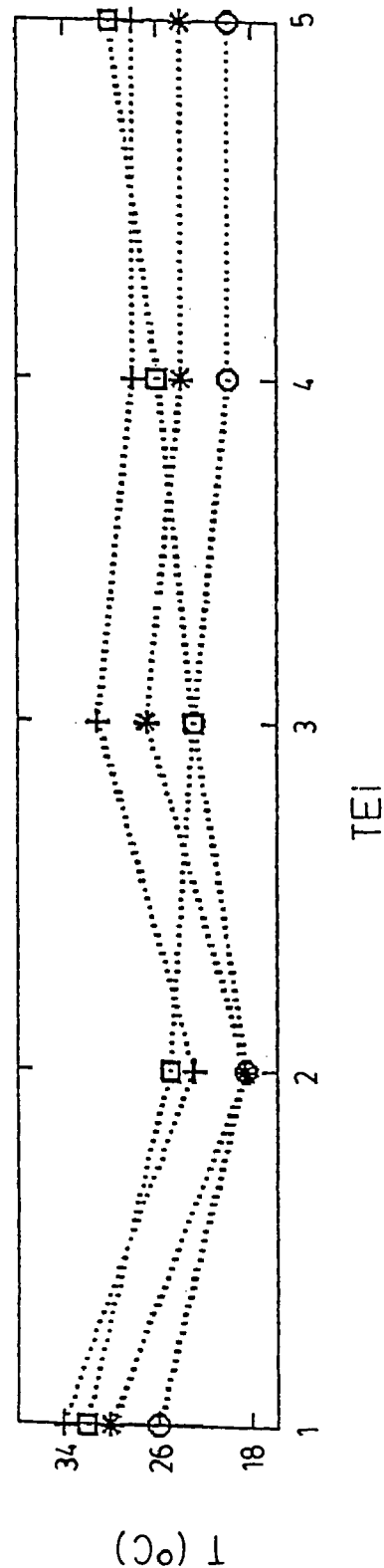
FIG. 22B shows the corresponding temperature profiles.

In this example of the present invention the optical filters 46 and 48 are Periodic Complex Fiber Bragg Gratings (PCFBG), corresponding to the designs presented in FIGS. 13A and 13B and FIGS. 14A and 14B, were realized by using complex phase masks. FIGS. 21A and 21B show experimental results of the CD compensator for a quasi-quadratic CD profile. The applied temperature values were TE1=32° C.; TE2=25° C.; TE3=23° C.; TE4=26° C.; TE5=30° C.; TE6=12° C. and TE7=12° C. FIGS. 22A and 22B illustrate the CD profiles obtained with different temperature profiles.

Of course, numerous modifications could be made to the embodiments above without departing from the scope of the present invention as defined in the appended claims.

The invention claimed is:

1. A device for tailoring the chromatic dispersion of a light signal having a plurality of periodically distributed wavelength channels, the device comprising:
   plurality of waveguide segments coupled together in a cascade, each of said waveguide segments being provided with a spatially distributed optical filter reflecting wavelength channels at different regions along the corresponding waveguide segment, each said optical filter having a continuous and spectrally periodic group delay response, the chromatic dispersion of each wavelength channel being determined by the combined group delay response of said optical filters along the regions of the waveguides segments reflecting said wavelength channel; and
   a spatially distributed tuning mechanism for tuning, independently in each of the regions of at least one of the waveguide segments, the group delay response of the corresponding optical filters.

2. The device according to claim 1, wherein said tuning mechanism comprises an apparatus for applying a perturbation of varying strength along said at least one of the optical filters.

3. The device according to claim 2, wherein said perturbation is a temperature gradient.

4. The device according to claim 3, wherein said apparatus comprises a plurality of thermo-electric elements spatially distributed along said corresponding waveguide segment.

5. The device according to claim 2, wherein the perturbation applied by said apparatus is monotonous.

6. The device according to claim 2, wherein the perturbation applied by said apparatus is discontinuous.

7. The device according to claim 2, wherein the perturbation applied by said apparatus is generally linear and has a positive slope along said corresponding waveguide segment.

8. The device according to claim 2, wherein the perturbation applied by said apparatus is generally linear and has a negative slope along said corresponding waveguide segment.

9. The device according to claim 2, wherein the perturbation applied by said apparatus is generally quadratic and has a positive curvature along said corresponding waveguide segment.

10. The device according to claim 2, wherein the perturbation applied by said apparatus is generally quadratic and has a negative curvature along said corresponding waveguide segment.

11. The device according to claim 2, wherein the perturbation applied by said apparatus is arbitrary along said corresponding waveguide segment.

12. The device according to claim 1, wherein said waveguide segments are optical fibers.

13. The device according to claim 12, further comprising a port optical circulator coupling a pair of said waveguide segments in said cascade.

14. The device according to claim 1, wherein said at least one of the optical filters comprises a distributed Gires-Tournois etalon.

15. The device according to claim 14, wherein said distributed Gires-Tournois etalon comprises at least two partially superimposed Chirped Fiber Bragg Gratings.

16. The device according to claim 1, wherein said at least one of the optical filters comprises a superstructured Bragg grating spectrally designed to produce the corresponding group delay response.

17. The device according to claim 1, wherein a spectral spacing between consecutive peaks of the group delay response of said at least one of the optical filters is half of an inter-channel spacing of said light signal.

18. The device according to claim 1, wherein a spectral spacing between consecutive peaks of the group delay response of said at least one of the optical filters is equal to an inter-channel spacing of said light signal.

* * * * *